United States Patent
Joshi et al.

(10) Patent No.: US 9,928,320 B2
(45) Date of Patent: Mar. 27, 2018

(54) TECHNIQUES FOR ESTIMATING COMPOUND PROBABILITY DISTRIBUTION BY SIMULATING LARGE EMPIRICAL SAMPLES WITH SCALABLE PARALLEL AND DISTRIBUTED PROCESSING

(71) Applicant: SAS Institute Inc., Cary, NC (US)

(72) Inventors: Mahesh V. Joshi, Cary, NC (US); Richard Potter, Cary, NC (US); Jan Chvosta, Raleigh, NC (US); Mark Roland Little, Cary, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/485,577

(22) Filed: Apr. 12, 2017

(65) Prior Publication Data

US 2017/0220713 A1  Aug. 3, 2017

Related U.S. Application Data

(63) Continuation of application No. 15/197,691, filed on Jun. 29, 2016, now Pat. No. 9,665,669, which is a continuation of application No. 14/626,143, filed on Feb. 19, 2015, now Pat. No. 9,563,725.

(60) Provisional application No. 62/017,437, filed on Jun. 26, 2014, provisional application No. 61/941,612, filed on Feb. 19, 2014.

(51) Int. Cl.
*G06G 7/48* (2006.01)
*G06F 17/50* (2006.01)
*G06F 17/18* (2006.01)

(52) U.S. Cl.
CPC .......... *G06F 17/5009* (2013.01); *G06F 17/18* (2013.01); *G06F 2217/10* (2013.01)

(58) Field of Classification Search
CPC ........ G06Q 10/06; G06Q 40/06; G06Q 40/08; G06Q 10/0635; G06F 17/5063
See application file for complete search history.

(56) References Cited

U.S. PATENT DOCUMENTS

| | | | |
|---|---|---|---|
| 8,341,063 B1 * | 12/2012 | Cernyar ................. | G06Q 40/06 705/35 |
| 2003/0149657 A1 * | 8/2003 | Reynolds ............... | G06Q 10/06 705/38 |
| 2007/0043656 A1 * | 2/2007 | Lancaster .............. | G06Q 40/08 705/38 |
| 2009/0204235 A1 * | 8/2009 | Dubinsky .......... | G06Q 10/0635 700/32 |
| 2009/0228846 A1 * | 9/2009 | McConaghy ....... | G06F 17/5063 716/106 |

(Continued)

*Primary Examiner* — Kandasamy Thangavelu

(57) ABSTRACT

Techniques for estimated compound probability distribution are described herein. Embodiments may include receiving, at a master node of a distributed system, a compound model specification comprising frequency models, severity models, and one or more adjustment functions, wherein at least one model of the frequency models and the severity models depend on one or more regressor and distributing the compound model specification to worker nodes of the distributed system, each of the worker nodes to at least generate a portion of samples for use in predicting compound distribution model estimates. Embodiments may also include predicting the compound distribution model estimates based on the sample portions of aggregate values and adjusted aggregate values.

24 Claims, 25 Drawing Sheets

(56) References Cited

U.S. PATENT DOCUMENTS

2013/0179196 A1* 7/2013 Brookman ............ G06Q 40/08
 705/4
2014/0019195 A1* 1/2014 Anne ................. G06Q 10/0635
 705/7.28

* cited by examiner

*1500*

*Receive a compound model specification comprising a frequency model and a severity model, the compound model specification including a model error comprising a frequency model error and a severity model error.*
*1502*

*Generate a plurality of frequency models from the frequency model and the frequency model error by perturbing the frequency model according to the frequency model error, wherein each of the generated plurality of frequency models corresponds to an adjustment of the received frequency model according to a deviation from the received frequency model within the frequency model error.*
*1504*

*Generate a plurality of severity models from the severity model and the severity model error by perturbing the severity model according to the severity model error, wherein each of the generated plurality of severity models corresponds to an adjustment of the received severity model according to a deviation from the received severity model within the severity model error.*
*1506*

*Generate a plurality of compound model samples from each of the plurality of frequency models and severity models.*
*1508*

*Generate aggregate statistics from the plurality of compound model samples.*
*1510*

Receive a plurality of model samples, the model samples implying a non-parametric distribution of aggregate loss events.
2102

Receive a candidate distribution definition, the candidate distribution definition comprising a combination of at least two component distributions, the candidate distribution definition comprising one or more parameters.
2104

Determine parameter values for the one or more parameters of the candidate distribution, the parameter values determined by optimizing a non-linear objective function through a search over a multidimensional space of parameter values, the optimization performed by a distribution fitting component operating on a processor circuit, the objective function calculating a distance between the non-parametric distribution of the loss events as implied by the model samples and a parametric distribution determined by application of potential parameter values to the candidate distribution definition.
2106

Generate approximated aggregate statistics for the plurality of model samples based on an optimized parametric distribution defined by the candidate distribution definition and the determined parameter values.
2108

Report the approximated aggregate statistics.
2110

*FIG. 21*

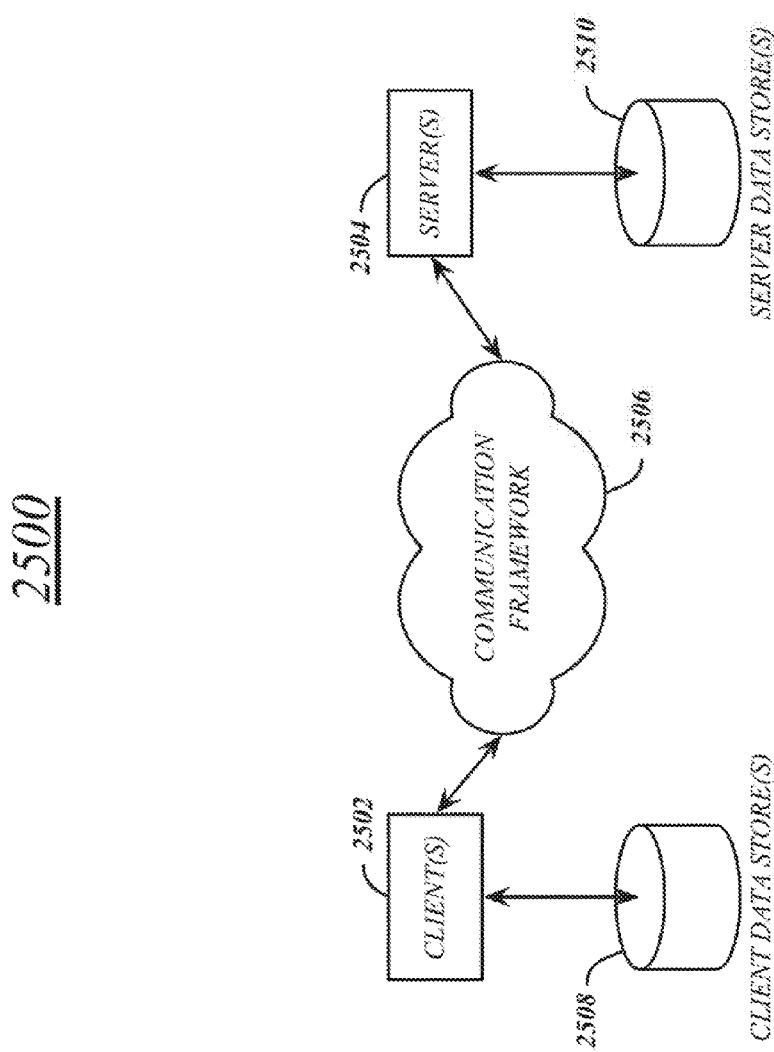

TECHNIQUES FOR ESTIMATING COMPOUND PROBABILITY DISTRIBUTION BY SIMULATING LARGE EMPIRICAL SAMPLES WITH SCALABLE PARALLEL AND DISTRIBUTED PROCESSING

RELATED APPLICATIONS

This application is a continuation under 35 U.S.C. § 120 of U.S. patent application Ser. No. 15/197,691, titled "Techniques for Estimating Compound Probability Distribution by Simulating Large Empirical Samples with Scalable Parallel and Distributed Processing," filed Jun. 29, 2016 and a continuation of U.S. patent application Ser. No. 14/626,143, titled "Techniques for Estimating Compound Probability Distribution by Simulating Large Empirical Samples with Scalable Parallel and Distributed Processing," filed Feb. 19, 2015, which claims the benefit of priority under 35 U.S.C. § 119(e) to U.S. Provisional Patent Application No. 61/941,612, titled "System and Methods for Estimating Compound Probability Distribution by Using Scalable Parallel and Distributed Processing," filed on Feb. 19, 2014. U.S. patent application Ser. No. 14/626,143 also claims the benefit of priority under 35 U.S.C. § 119(e) to U.S. Provisional Patent Application No. 62/017,437, titled "System and Methods for Compressing a Large, Empirical Sample of a Compound Probability Distribution into an Approximate Parametric Distribution by Using Parallel and Distributed Processing," filed on Jun. 26, 2014. The subject matter of U.S. patent application Ser. Nos. 15/197,691 and 14/626,143 and U.S. Provisional Patent Application Nos. 61/941,612 and 62/017,437 are hereby incorporated herein by reference in their respective entireties.

This application is related to a United States Patent Application with a shared specification and drawings with Ser. No. 14/626,187, titled "Techniques for Compressing a Large Distributed Empirical Sample of a Compound Probability Distribution into an Approximate Parametric Distribution with Scalable Parallel Processing," filed on Feb. 19, 2015, which is hereby incorporated by reference in its entirety.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for estimated compound probability distributions. Some embodiments are particularly directed to techniques for estimated compound probability distributions where samples for the compound probability distributions are generated using scalable parallel and distributed processing. Some embodiments are particularly directed to techniques for estimated compound probability distributions where an approximated distribution is estimated from the samples using scalable parallel and distributed processing. The samples may represent an empirical estimate of the compound distribution. The approximated distribution may correspond to a parametric estimation of the compound distribution.

In one embodiment, for example, an apparatus may comprise a configuration component, perturbation component, sample generation controller, and an aggregation component. The configuration component may be operative to receive a compound model specification comprising a frequency model and a severity model, the compound model specification including a model error comprising a frequency model error and a severity model error. The perturbation component may be operative to generate a plurality of frequency models from the frequency model and the frequency model error by perturbing the frequency model according to the frequency model error, wherein each of the generated plurality of frequency models corresponds to an adjustment of the received frequency model according to a deviation from the received frequency model within the frequency model error, and to generate a plurality of severity models from the severity model and the severity model error by perturbing the severity model according to the severity model error, wherein each of the generated plurality of severity models corresponds to an adjustment of the received severity model according to a deviation from the received severity model within the severity model error. The sample generation controller may be operative to initiate the generation of a plurality of compound model samples from each of the plurality of frequency models and severity models. The aggregation component may be operative to generate aggregate statistics from the plurality of compound model samples. Other embodiments are described and claimed.

In another embodiment, for example, an apparatus may comprise a configuration component, a distribution fitting component, and a statistic generation component. The configuration component may be operative to receive a candidate distribution definition, the candidate distribution definition comprising a combination of at least two component distributions, the candidate distribution definition comprising one or more parameters. The distribution fitting component may be operative to receive a plurality of model samples, the model samples implying a non-parametric distribution of loss events, and determine parameter values for the one or more parameters of the candidate distribution, the parameter values determined by optimizing a non-linear objective function through a search over a multidimensional space of parameter values, the optimization performed by a distribution fitting component operating on a processor circuit, the objective function calculating a distance between the non-parametric distribution of the loss events as implied by the model samples and a parametric distribution determined by application of potential parameter values to the candidate distribution definition. The statistics generation component may be operative to generate approximated aggregate statistics for the plurality of model samples based on an optimized parametric distribution defined by the candidate distribution definition and the determined parameter values and report the approximated aggregate statistics.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 15 illustrates an example of an embodiment of a logic flow for the system of FIG. 1.

FIG. 21 illustrates an example of an embodiment of a logic flow for the system of FIG. 1.

FIG. 25 illustrates an example of an embodiment of a communications architecture.

DETAILED DESCRIPTION

Figure 1:
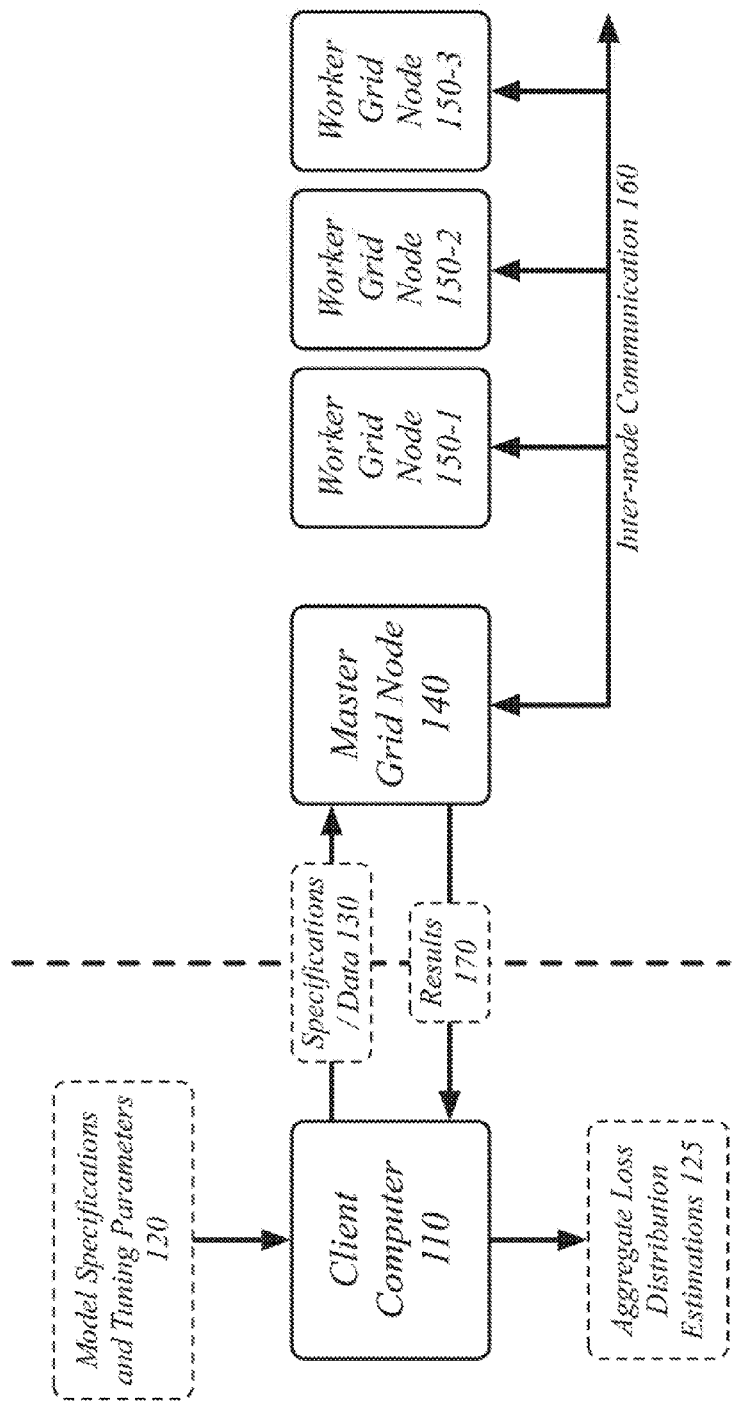
FIG. 1 illustrates an example of a computing architecture for an aggregate distribution analysis system.

Various embodiments are directed to techniques to generate aggregate statistics from a compound model specification that is comprised of a frequency model and a severity model. The frequency model may correspond to a predicted distribution for the frequency of events and the severity model may correspond to a predicted distribution for the severity of events. Together these define a compound model specification incorporating a distribution of both the frequency and severity of events in which the frequency of events and severity of events may be statistically independent. However, combining the frequency model and severity model analytically may be intractable. As such, event samples may be generated according to both the frequency and severity models, with the aggregate statistics generated from the event samples. Because this technique may be used to account for unlikely events, very large samples may be generated, such as samples with one million or ten million observations. In order to generate and analyze such large samples within a reasonable time scale—for example, running an analysis within a few minutes during a working day or running multiple analyses overnight during a period of low demand on a computing cluster—distributed processing may be leveraged for the generation and analysis of samples.

An entity may be aided by generating statistics related to predicted losses. These predictions may aid the entity in planning for the future. In some cases, these predictions may be requirements imposed by agencies for the practice of certain kinds of entities. These entities may be particularly concerned with the probability of multiple unlikely events occurring in close proximity as this sort of concurrence may be represent a particular risk to the stability of the entity due to the difficulty in absorbing multiple large losses. As such, the generation and analysis of a multiple number of large samples may be desirable in order to create a meaningful subset in which unlikely events are sufficiently represented. As a result, the embodiments can improve affordability and scalability of performing loss risk assessment for an entity.

This application discloses a system and associated techniques for quantitative loss modeling, including at least the following features:

1. A system that estimates the compound probability distribution model by employing parallel and distributed algorithms for aggregate loss modeling that compounds the frequency and severity models. Algorithms can be executed on a grid of computers. This gives it the unique ability to estimate models significantly faster on large amounts of input data.

2. A system that offers the ability to assess effects of uncertainty in the parameters of frequency and severity models on the estimates of the compound distribution model.

3. A system that can conduct scenario analysis by enabling users to model effects of external factors not only on the probability distributions of frequency and severity of losses but also on the compound distribution of the aggregate loss. Further, if the user provides information about the uncertainty in the external factors, then the system can assess its effect on the compound distribution.

4. A system that offers customization capability by enabling users to specify several loss adjustment functions to request that the system estimate distributions of aggregate adjusted losses.

Most modern entities collect and record information about losses. Such information often includes the number of loss events that were encountered in a given period of time, the magnitude of each loss, the characteristics of the entity that incurred the loss, and the characteristics of the economic environment in which the loss occurred. Because data about past losses are more readily available, quantitative modeling of losses is becoming an increasingly important task for many entities. One goal is to estimate risk measures such as value at risk (VaR) and tail VaR that depend on the estimate of the probability distribution of the aggregate loss that are expected to be observed in a particular period of time. Several mathematical and statistical approaches are possible, but one of the most commonly used and desirable approaches is to estimate separate probability distribution models for the frequency (number) of loss events and the severity (magnitude) of each loss, and then to combine those models to estimate the distribution of the aggregate loss.

The estimation of aggregate loss distribution is a mathematically complex problem even for one pair of frequency and severity distributions, which corresponds to a single unit. When one wants to analyze the aggregate loss for a group of entities, the size of the problem is multiplied by the number of units. A simulation-based approach is used to overcome the mathematical complexity. However, it still remains a computationally intensive problem, because the larger the sample one can simulate, the more accurate the estimate of aggregate loss distribution will be, and the larger the number of units, the larger the number of simulations are required to simulate just one point of the sample. Thus, aggregate loss modeling problem tends to currently primarily be a big computation problem.

Various implementations of this disclosure propose parallel and distributed computing algorithms and architecture(s) to implement the aggregate loss modeling. Each implementation involves distribution of computations to a grid of multicore computers that cooperate with each other over communication channels to solve the aggregate loss modeling problem faster and in a scalable manner. Further, the various implementations of this disclosure propose a parallel and distributed algorithm to quantitatively assess how the distribution of the aggregate loss is affected by the uncertainty in the parameters of frequency and severity models and the uncertainty in estimated external effects (regressors). The proposed solution exploits the computing resources of a grid of computers to simulate multiple perturbed samples and summarizes them to compute the mean and standard error estimates of various summary statistics and percentiles of the aggregate loss distribution.

Reference is now made to the drawings, where like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a computing architecture for an aggregate distribution analysis system 100. The computing architecture illustrated in FIG. 1 may include a grid computing architecture for use, at least in part, for performance of the aggregate distribution analysis system 100. It will be appreciated that the computing architecture illustrated in FIG. 1 may also be used for other tasks, and may comprise a general grid computing architecture for use in various distributed computing tasks. Although the aggregate distribution analysis system 100 shown in FIG. 1 has a limited number of elements in a certain topology, it may be appreciated that the aggregate distribution analysis system 100 may include more or less elements in alternate topologies as desired for a given implementation. The proposed technique may make use of a parallel or grid computing architecture.

It is worthy to note that "a" and "b" and "c" and similar designators as used herein are intended to be variables representing any positive integer. Thus, for example, if an implementation sets a value for a=5, then a complete set of components 122 may include components 122-1, 122-2, 122-3, 122-4 and 122-5. The embodiments are not limited in this context.

The general flow of the solution in each phase of aggregate loss distribution estimation is as follows:

1. The user submits input instructions on the client computer 110, including loss model specification and tuning parameters 120.

2. The client computer 110 parses the instructions and communicates the problem specification to the master grid node 140 of the grid appliance. If the input data is located on the client, then the client reads the data and sends it to the master node as a combined specifications/data 130.

3. The master node communicates the problem specification to the worker grid nodes 150 via inter-node communication 160. If the input data is the scenario data, then it is copied to all worker grid nodes 150. If the input data contains externally simulated counts data that is received from the client, then the master grid node 140 distributes the input data equitably among all worker grid nodes 150. If the externally simulated counts data is big, it may already be pre-distributed among worker nodes.

4. All grid nodes cooperatively decide which pieces of the problem each grid node works on. The work of simulating an unperturbed sample of size M is distributed such that each of the W workers simulates approximately M/W points of the total sample. The work of simulating P perturbed samples is distributed among W workers such that each worker simulates P/W M-sized samples when P is greater than or equal to W. If P is less than W, then each worker simulates M/W points of each of the P perturbed samples. The number of workers W may correspond to the number of worker grid nodes and may vary in various embodiments and implementations, with each of the worker grid nodes 150 executing a worker. Each worker may itself may have a plurality of threads or processes.

5. Each worker splits its local problem into multiple independent pieces and executes them by using multiple parallel threads of computation to achieve further gain in speed. Upon finishing its work, the worker communicates its local results to the master grid node 140, which accumulates the results from all the workers.

6. Once the problem is solved, the master grid node 140 gathers the final results from workers, summarizes those results, and communicates them back to the client computer 110 as results 170.

7. The client computer 110 receives the results, displays them to the user as aggregate loss distribution estimates 125, and persists them for consumption by a subsequent phase or by the user.

Parallel and Distributed Frequency and Severity Modeling

Figure 2:
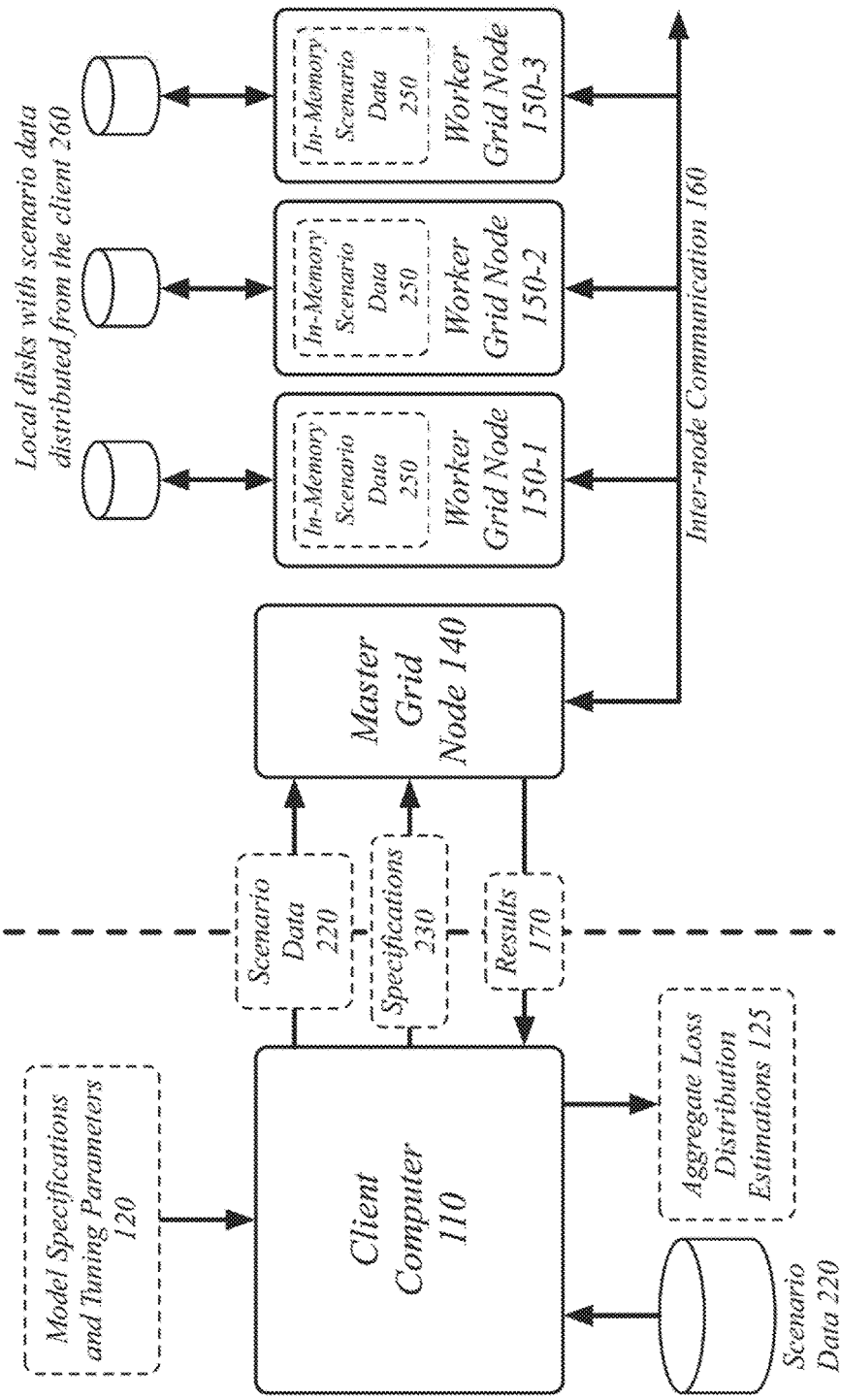
FIG. 2 illustrates an example of an embodiment of the aggregate distribution analysis system in which the scenario data is located on a client computer prior to analysis.

FIG. 2 illustrates an embodiment of the aggregate distribution analysis system 100 in which the scenario data is located on the client computer 110 prior to analysis. The client computer 110 first sends the data to the master grid node 140 of the grid, which then distributes the data to the worker grid nodes 150. Before estimation, each worker grid node reads all the data from its local disk and stores it in its main memory (e.g., RAM).

Client computer 110 may comprise a data store containing scenario data 220 or have access to a data store containing scenario data 220, the data store distinct from the disks local to the worker grid nodes 150. Client computer 110 may access scenario data 220 and transmit it to the master grid node 140. Client computer 110 may further receive model specifications and tuning parameters 120. The model specifications may be transmitted to master grid node 140 as specifications 230. The number of worker grid nodes 150 may be determined according to the tuning parameters.

Worker grid nodes 150 may receive the scenario data 220 and store it as local disks with scenario data distributed from the client 260. During processing of the scenario data 220, each of the worker grid nodes 150 may make a copy of the information from its local disk with input data distributed from the client 260 to their main memory (e.g. RAM) to form in-memory scenario data 250. When the scenario data contains a count variable simulated from an empirical frequency model, the in-memory scenario data 250 on each of the worker grid nodes 150 may comprise only a portion of the total scenario data 250, with each of the worker grid nodes 150 operating on only a subset of the scenario data 220. When the scenario data does not contain a count variable simulated from an empirical frequency model, the in-memory scenario data 250 on each of the worker grid nodes 150 may comprise a full copy of the total scenario data 250.

Figure 3:
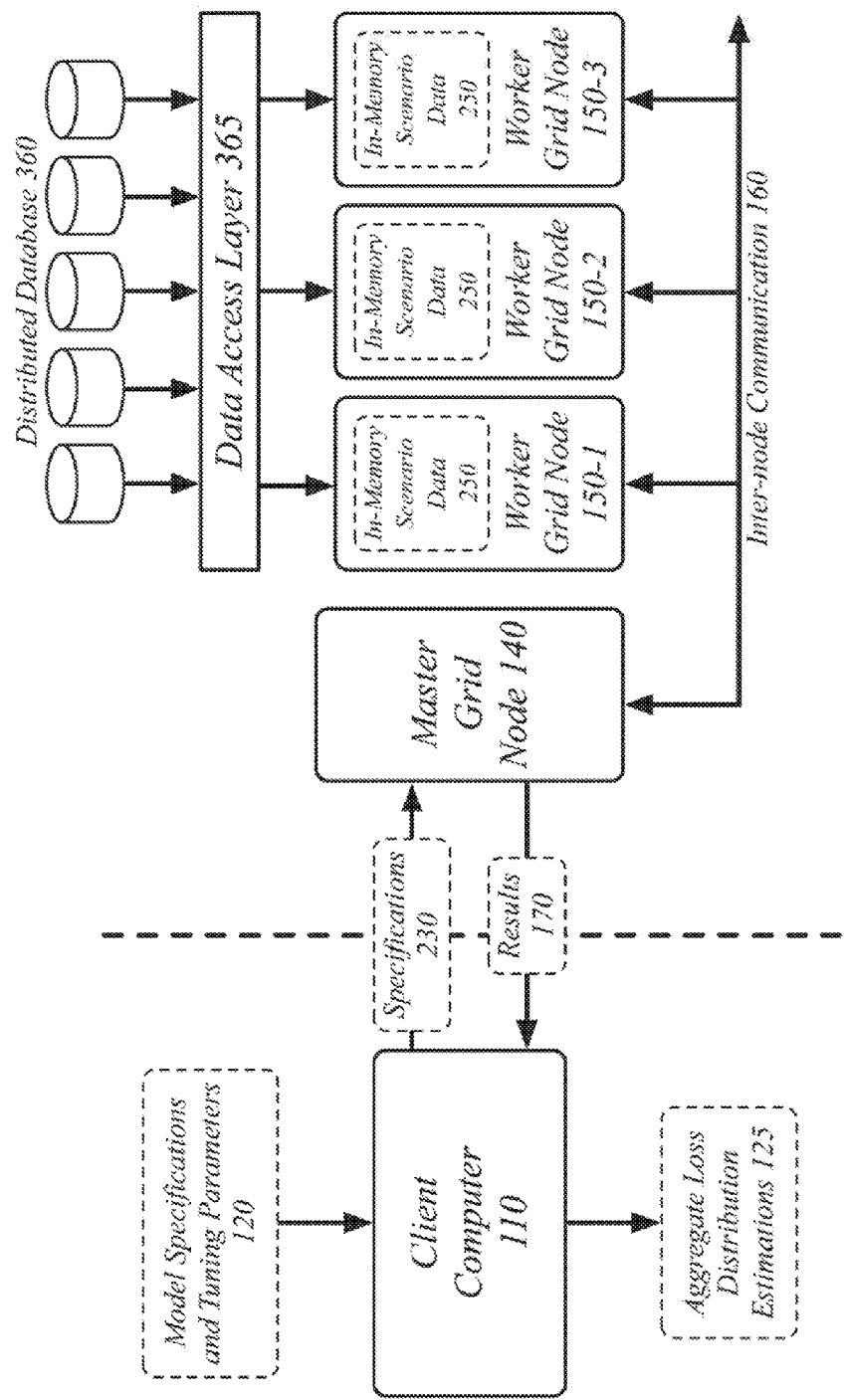
FIG. 3 illustrates an example of an embodiment of the aggregate distribution analysis system in which the scenario data is already in a distributed database prior to analysis.

FIG. 3 illustrates an embodiment of the aggregate distribution analysis system 100 in which the scenario data is already in a distributed database 360 prior to analysis. This data might contain a count variable simulated from an empirical frequency model external to the aggregate distribution analysis system 100. As shown in FIG. 3, the scenario data is already available in a distributed database 360, with a data access layer 365 operative to access the data from the distributed database 360 and send appropriate portions of the data to each of the worker grid nodes 150, which stores its allocated part in its main memory (e.g., RAM).

Note that the number of worker grid nodes 150 need not be the same as the number of nodes in the distributed database 360. The distribution of the scenario data 220 from the distributed database 360 to the worker grid nodes 150 may include a re-division of the scenario data 220 from the division of it between the nodes of the distributed database 360 to the division of it between the worker grid nodes 150. Alternatively, in some embodiments, the nodes of the distributed database 360 may be equal in number to the number of worker grid nodes 150, with each of the worker grid nodes 150 receiving its portion of the scenario data 220 from a particular one of the nodes of the distributed database 360.

Parallel and Distributed Aggregate Loss Modeling

The aggregate loss modeling process uses the frequency and severity models that are specified in the model specification to estimate the distribution of the aggregate loss. The aggregate loss S in a particular time period is defined as $$S = \sum_{j=1}^{N} X_j$$

where N represents the frequency random variable for the number of loss events in that time period, and X represents the severity random variable for the magnitude of one loss event. One goal is to estimate the probability distribution of S. Let $F_X(x)$ denote the cumulative distribution function (CDF) of X; let $F^{*n}_X(x)$ denote the n-fold convolution of the CDF of X; and let $Pr(N=n)$ denote the probability of seeing n losses as per the frequency distribution. The CDF of S is theoretically computable as $$F_S(s) = \sum_{n=0}^{\infty} Pr(N=n) \cdot F^{*n}_X(x).$$

The probability distribution model of S, characterized by the CDF $F_S(s)$, is referred to as a compound distribution model (CDM). Direct computation of $F_S$ is usually a difficult task because of the need to compute the n-fold convolution. An alternative is to use Monte Carlo simulation to generate a sufficiently large, representative sample of the compound distribution. In addition to its simplicity, the simulation method applies to any combination of distributions of N and X.

The simulation method is especially useful to handle the following requirements that the real-world situations demand and the challenges that those pose:

1. When the user specifies regression effects in the models of N and X, the distributions of N and X depend on the regressor values, which in turn makes the distribution of S dependent on the regressor values. This makes the aggregate loss modeling process a what-if or scenario analysis process. The user can specify a scenario that consists of one or more units and the characteristics of each unit are encoded by the set of regressor values that are specific to that unit. For example, an entity might want to estimate distribution of aggregate losses combined across multiple operating environments. Each operating environment might be characterized by a set of metrics that measure market conditions and internal operational characteristics of the entity. A subset of those metrics might be used as regressors in the model of N and another, potentially overlapping, subset of metrics, might be used as regressors in the model of X. One unit is then defined as one set of metric values for one operating environment and a scenario might consist of multiple such operating environments.

2. The user might also be interested in estimating the distribution of an adjusted loss by applying some modifications to the loss that a unit generates. For example, a entity might want to estimate the distribution of the payments that it needs to make to a group of policyholders in a particular time period, where the payment is determined by applying adjustments such as the deductible and the maximum payment limit to the actual loss that the policyholder incurs. The user might want to estimate distributions of multiple such quantities that are derived by adjusting the ground-up loss. In this case, one policyholder acts as one unit. Multiple such units might be processed together as one scenario.

3. When the models of N and X are estimated, the parameters of each model are not known with certainty. The parameters can be thought of as random variables that are governed by a particular probability distribution. For example, the severity model parameters might be governed by a multivariate normal distribution, in which case the severity modeling process essentially estimates the mean and covariance of the multivariate normal distribution. Further, regressor values that are used to specify a scenario might also be estimated, for example, by using some time series forecasting method. In this case, each regressor is a random variable that is governed by some probability distribution. To get accurate estimates of the aggregate loss distribution, the simulation process can account for the effect of parameter and regressor uncertainties on the aggregate loss distribution, and can produce estimates of the uncertainty in the estimates of the CDM. This process is referred to as perturbation analysis.

Aspects of this disclosure proposes a system to estimate the CDM by using a parallel and distributed algorithm to simulate a large sample of the aggregate loss and corresponding large samples of aggregate adjusted losses while accounting for the regression effects, if any. The system also proposes a parallel and distributed algorithm for perturbation analysis.

The input to the aggregate loss modeling phase can involve the following:

Frequency Model:

The frequency model can be provided in two forms: a parametric frequency model and an empirical model. The parametric frequency model can be specified by the distribution family, parameter estimates, and the set of regressors that the model depends on. The empirical model can be expressed as a sufficiently large sample of the number of loss events that each unit generates. A large sample might contain millions of simulated observations, for example. For an empirical frequency model, the perturbation analysis assumes that frequency model does not have any uncertainty.

Severity Model:

The parametric severity model can be specified by the distribution family, parameter estimates, and the set of regressors that the model depends on.

Parameter Uncertainty Estimate:

If the user wants the system to conduct the perturbation analysis for parameters, then a joint distribution of frequency and severity parameters can be specified. This distribution can be a distribution that system is aware of (for example, the multivariate normal distribution), in which case system can internally make random draws from the distribution. It can also be a custom distribution, in which case the user may provide the mechanism to make random draws.

Loss Adjustment Functions:

A user can specify one or more loss adjustment functions. Each function operates on a simulated ground-up loss (severity) value to compute an adjusted loss. The system generates as many aggregate adjusted loss samples as the number of loss adjustment functions. It will be appreciated that the user may not specify any loss adjustment functions as the use of loss adjustment functions is optional.

Scenario Data:

This includes observations for multiple units such that each observation records the following for each unit: count variable for the empirical frequency model, if the specified frequency model is empirical; any variables that are required by the loss adjustment functions; values of regressors that are used in the frequency model when the frequency model is not empirical; values of regressors that are used in the severity model; and an estimate of uncertainty that is associated with the value of regressor if the user wants the system to use regressor uncertainty in the perturbation analysis. In a simple form, the uncertainty can be specified in the form a standard error, in which case, the system assumes that the regressor has a normal distribution with the mean and standard deviation estimates that appear in the observation. In general, the user can specify the uncertainty in the form of any univariate distribution from a parametric family by specifying the distribution family and the parameter estimates. If the distribution is known to the system, then the system uses the quantile function of the distribution to make random draws of the regressor value while conducting the perturbation analysis. If the distribution is a custom distribution, then the user needs to supply either the quantile function or the CDF function that the system can invert internally.

Tuning Parameters:

Some of key tuning parameters include the size of the sample to generate, number of perturbed samples to generate, whether to perturb the model parameters or regressors or both, the number of worker grid nodes to use, and the number of parallel threads of computations to use on each worker node. The system chooses appropriate default value when the user does not provide a value for a tuning parameter.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
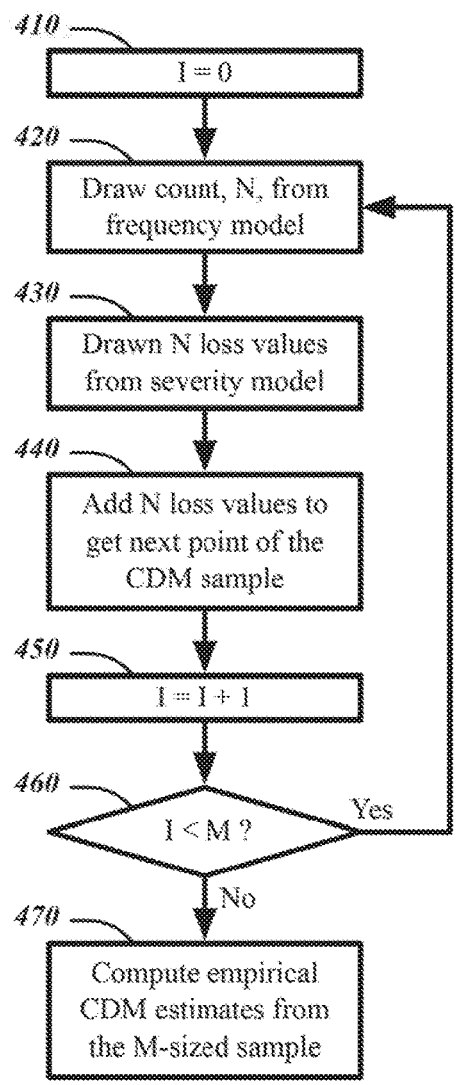
FIG. 4 illustrates an example of a logic flow for computing empirical compound distribution model (CDM) estimates.

FIG. 4 illustrates a logic flow for computing empirical compound distribution model (CDM) estimates. In a simple form—that is when frequency and severity models do not contain regression effects and when the user does not want the system to conduct the perturbation analysis, the simulation process, when executed on one machine with one thread, is as shown in FIG. 4, where M is the size of the sample to simulate. The CDM is estimated by computing the empirical estimates of various moments and percentiles of the compound distribution (CD).

The logic flow 400 may set a parameter I to 0 at block 410. I may represent a parameter for managing the iteration of the simulation process.

The logic flow 400 may draw the count, N, from the frequency model at block 420. N represents the frequency random variable for the number of loss events, the count, in the time period being analyzed. The frequency model represents a distribution of possible values for N and a particular value for N is generated based on this distribution.

The logic flow 400 may draw N loss values from the severity model at block 430. With the number of losses N determined, N losses will be generated. The severity model represents a distribution of possible loss values, the magnitude of losses that may be experienced by a unit. For each of the N losses, a loss value is independently generated according to this distribution.

The logic flow 400 may add the N loss values to get the next point of the CDM sample. Adding these loss values determines the total loss for the period of time under consideration and therefore goes towards generating an analysis of total loss for the period.

The logic flow 400 may increment the parameter I at block 450.

The logic flow 400 may determine whether the parameter I is less than M at block 460. If so, then the desired number of samples, M, has not yet been generated and the logic flow 400 continues to block 420. If not, then the desired number of samples has been generated and the logic flow 400 may continue to block 470. It will be appreciated that any control structure for iteratively performing a sequence of operations M times may be employed as an alternative to iterating a parameter I.

The logic flow 400 may compute the empirical CDM estimates from the M-sized sample at block 470.

Figure 5:
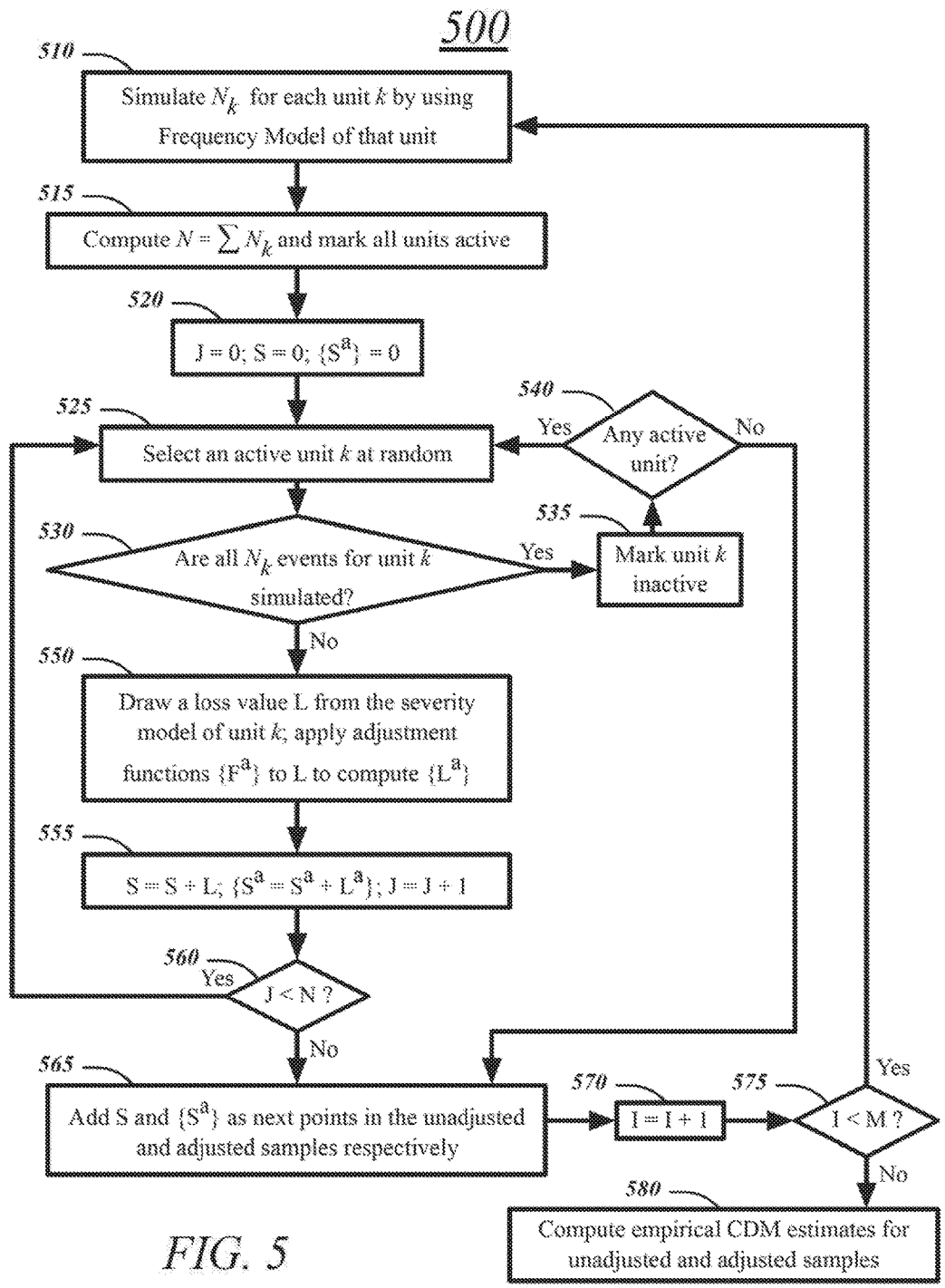
FIG. 5 illustrates an example of a logic flow for computing empirical compound distribution model (CDM) estimates in the presence of scenario data.

FIG. 5 illustrates a logic flow for computing empirical compound distribution model (CDM) estimates in the presence of scenario data. When the frequency or severity model contains regression effects and the user specifies one or more loss adjustment functions, then the simulation algorithm is as shown in FIG. 5. The algorithm ensures that the order of loss events is randomized across all units in the current scenario, which mimics a real-world process. This is especially useful when the loss adjustment function needs to use the aggregate loss across all units to adjust the next loss. In the flowchart, $\{F^a\}$ denotes a set of loss adjustment functions, and quantities that are derived by using these functions are denoted with the set notation such as $\{S^a\}$.

The logic flow 500 may simulate $N_k$ loss events for each unit k by using the frequency model of that unit at block 510.

The logic flow 500 may compute $N=\Sigma N_k$ and mark all units active at block 515. As $N_k$ corresponds to the number of loss events for a particular unit according to the frequency model for that unit, N, the total number of losses, can be determined according to the sum of the individual $N_k$.

The logic flow 500 may set parameter J to zero, parameter S to zero, and parameters $\{S^a\}$ to zero at block 520. The parameter J may be used to count the number of loss events that have been simulated, to be compared to N. It will be appreciated that any technique for performing a specific number of iterations N for generating loss events may be used. The parameter S may be used to accumulate the aggregate loss across of all loss events that are generated by all units. The parameters $\{S^a\}$ may be used to accumulate the aggregate adjusted loss across all loss events that are generated by all units, for each of the loss adjustment functions $\{F^a\}$.

The logic flow 500 may select an active unit k at random at block 525.

The logic flow 500 may determine whether all $N_k$ events for unit k have been simulated at block 530. If they have been, the logic flow 500 may proceed to block 535. If not, the logic flow 500 may proceed to block 550.

The logic flow 500 may mark unit k inactive at block 535. As all $N_k$ events have been simulated for a particular unit, no additional events will be simulated for that unit and the logic flow 500 may continue to block 540.

The logic flow 500 may determine whether any active unit is remaining at block 540. As one of the units has now, at block 535, been marked as inactive due to all of its events being simulated, all of the units may be finished. If no unit is still active the logic flow 500 is finished simulating the events for a particular sample point and may continue to block 565. Otherwise the logic flow 500 may loop back to block 525 to select a different active unit.

The logic flow 500 may draw a loss value L from the severity model of unit k and apply adjustment functions $\{F^a\}$ to L to compute $\{L^a\}$ at block 550.

The logic flow 500 may set parameter S to be S+L, set $\{S^a=S^a+L^a\}$, and increment parameter J at block 555.

The logic flow 500 may determine whether J is less than N at block 560. If it is, then not all events have yet been generated for this sample point, and the logic flow 500 proceeds back to block 525. Otherwise, the logic flow 500 proceeds to block 565.

The logic flow 500 may add S and $\{S^a\}$ as next points in the unadjusted and adjusted samples respectively at block 565.

The logic flow 500 may increment the parameter I at block 570.

The logic flow 500 may determine whether I is less than M at block 575. If it is, additional samples are to be generated and the logic flow 500 loops back to block 510. If not, all samples have been generated and the logic flow 500 proceeds to block 580.

The logic flow 500 may compute empirical CDM estimates for unadjusted and adjusted samples at block 580.

Figure 6:
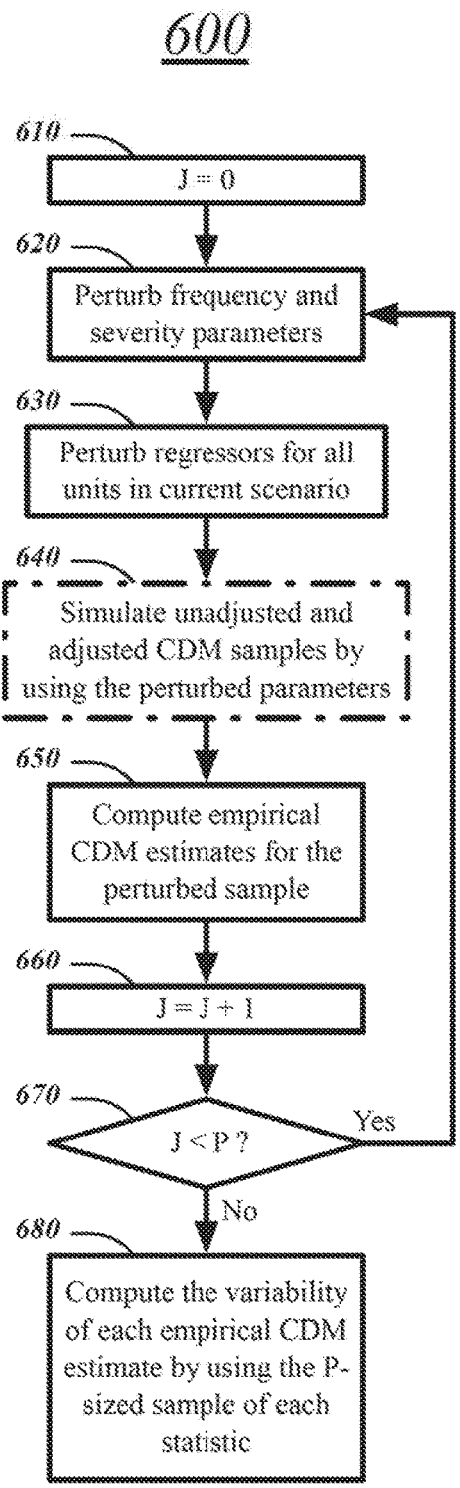
FIG. 6 illustrates an example of a logic flow for computing variability in empirical compound distribution model (CDM) estimates by using perturbation analysis.

FIG. 6 illustrates a logic flow for computing variability in empirical compound distribution model (CDM) estimates by using perturbation analysis. When the user requests perturbation analysis, the algorithm to conduct the perturbation analysis with P perturbed samples is shown in FIG. 6, where the dash-dot block 640 executes either the simple algorithm of FIG. 4 or the scenario analysis algorithm of FIG. 5 for the desired sample size. The "Perturb" operations perturb the model parameters or regressors by drawing at random values from their respective univariate or multivariate distributions that the user has specified.

The logic flow 600 may set a parameter J to zero at block 610. The parameter J may be used to count the number of perturbed samples that have been generated, to be compared to P, the number of perturbed samples to be generated. It will be appreciated that any technique for performing a specific number of iterations P for generating perturbed samples may be used.

The logic flow 600 may perturb frequency and severity parameters at block 620. The parameters may be perturbed according to the distributions defined by the frequency model and severity model of a compound model specification.

The logic flow 600 may perturb the regressors for all units in a current scenario at block 630.

The logic flow 600 may simulate unadjusted and adjusted CDM samples by using the perturbed parameters at block 640. The simulation of CDM samples may be performed using either of the algorithms described with reference to FIG. 4 and FIG. 5.

The logic flow 600 may compute empirical CDM estimates for the perturbed sample at block 650.

The logic flow 600 may increment the count parameter J at block 660.

The logic flow 600 may determine whether the count parameter J has reached the desired number of perturbed samples P at block 670. If so, the logic flow 600 may proceed to block 680. If not, the logic flow 600 may loop back to block 620 for the generation of additional perturbed samples.

The logic flow 600 may compute the variability of each empirical CDM estimate by using the P-sized sample of each statistic at block 680.

Figure 7:
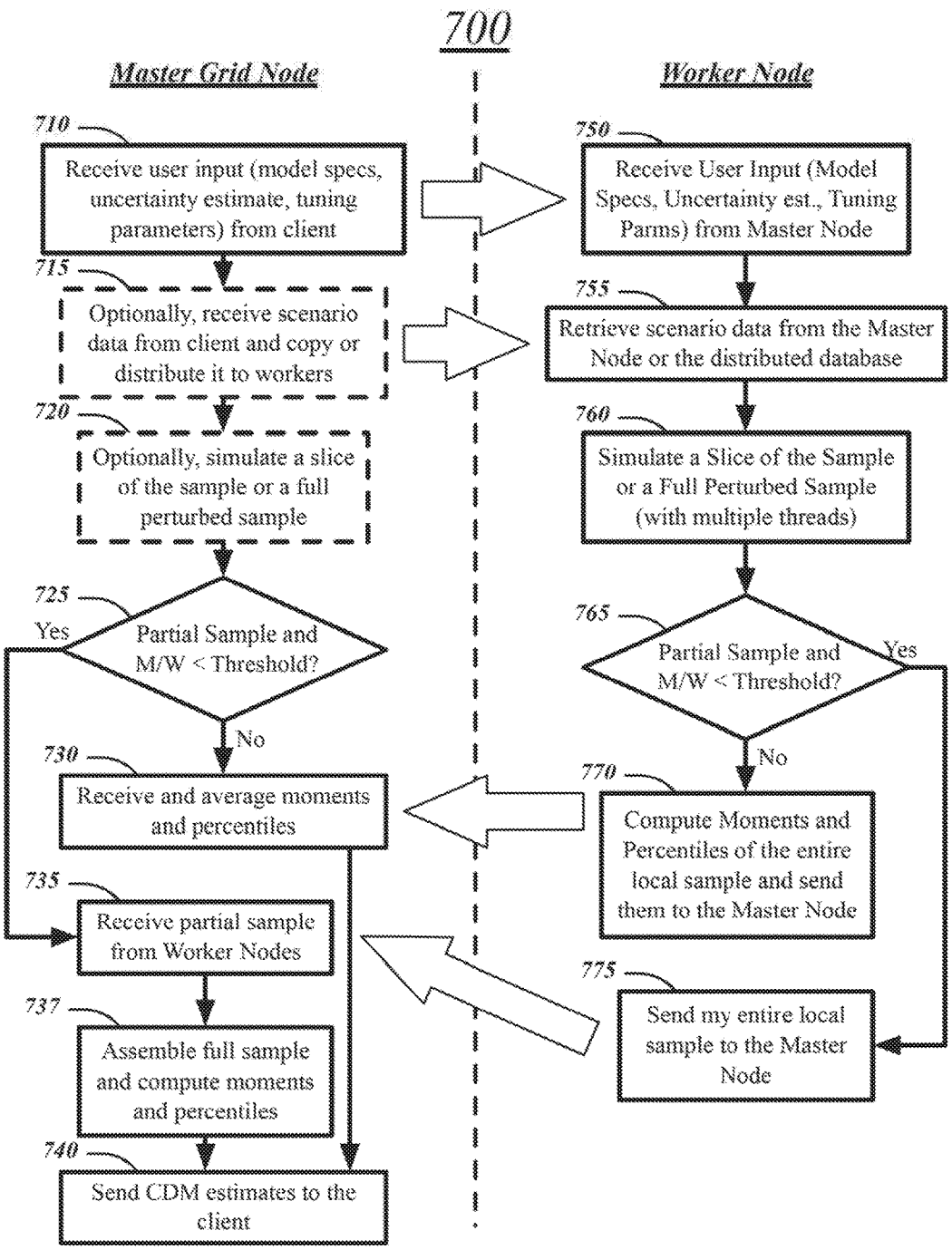
FIG. 7 illustrates an example of a logic flow for computing empirical compound distribution model (CDM) estimates for one unperturbed or perturbed sample in a parallel and distributed manner.

FIG. 7 illustrates a logic flow for computing empirical compound distribution model (CDM) estimates in a parallel and distributed manner. This parallel and distributed algorithm is shown in FIG. 7. The key is to distribute the total work among the worker nodes such that the CDM estimates are computed in a scalable manner. The following describes various operations of the algorithm for simulating one set of compound distribution sample. The algorithm for perturbation analysis, which requires simulation of multiple sets of compound distribution sample, can be implemented by repeating multiple times some operations of the example algorithm of FIG. 7. The computer algorithm starts after the client sends the user input (model specifications with uncertainty estimates, definitions of loss adjustment functions, and turning parameters) and the scenario data to the master node. The logic flow 700 reflects receiving the user input at block 710. The master broadcasts (copies) the user input to all worker nodes, with the worker nodes receiving the user input at block 750. The logic flow 700 reflects optionally receiving the scenario data at block 715, with the worker nodes each receiving either a copy (if each one receives all of the scenario data) or slice (if each one only receive a portion of the scenario data) at block 755.

If the user has provided externally simulated counts (empirical frequency model), then the master node distributes the scenario data equitably among worker nodes. The data flow is similar to the flow that is shown in FIG. 2, except that the scenario data are distributed instead of the loss data. If the user's scenario data does not contain externally simulated counts, then the master node broadcasts a copy of the entire scenario data to all worker nodes. Again, the data flow is similar to the flow that is shown in FIG. 2, except that the scenario data is copied to and not distributed among all worker nodes.

The algorithm to simulate an unperturbed sample proceeds as follows. If the user has not specified any scenario data or the user has specified the scenario data without the externally simulated counts, then the total sample size M is divided equally among W worker nodes and each worker node simulates a sample of size M/W. Block 760 in the flowchart executes the algorithm of FIG. 4 (no scenario data and no loss adjustment functions) or FIG. 5 (for scenario analysis). Note that the master node can itself simulate a portion of the sample when the counts are simulated internally, in which case, worker nodes and the master node each simulate a sample of size of M/(W+1), with block 720 therefore being optional. For simplicity of explanation, the subsequent description assumes that the master node doesn't simulate any portion of the sample, but the proposed system does not preclude such possibility.

If the user has specified scenario data with externally simulated counts, then each worker node executes the algorithm of FIG. 5 in the grey block for the portion of counts that are assigned to it.

The system provides the user two options to receive the estimates of the CDM. The system can send the entire simulated CDM sample to the client if the user requests it, or the system can prepare an empirical estimate of the CDM. If the sample size is too large, the former option can be very expensive due to communication costs, in which case, it is recommended that the user use the second option. The system computes the empirical estimate of the CDM as a set the estimates of various moments and percentiles of the compound distribution. There are two ways to compute the empirical estimates of the CDM in a parallel and distributed manner, depending on whether the total number of sample points, C, that a worker simulates is smaller than a threshold. C is equal to M/W when counts are simulated internally and it is equal to the number of observations of the scenario data that are allocated to a worker node when the user specifies externally simulated counts (empirical frequency model):

The logic flow 700 may determine at blocks 725 and 765 whether C is smaller than a threshold. If C is, then each worker node sends its locally simulated sample to the master node, at blocks 735 and 775. The master grid node may then assemble the M-sized sample and use the M-sized sample to compute estimates of the moments and percentiles at block 737.

If C is larger than a threshold, then the logic flow 700 may proceed to blocks 730 and 770. Each worker node summarizes the sample that it simulates to compute local estimates of the moments and percentiles and sends them over to the master node, which computes the average over all worker nodes to produce the final estimates of the summary statistics and percentiles of the aggregate distribution.

The estimates of the moments, such as mean, variance, skewness, and kurtosis, are computable for the M-sized sample whether the M-sized sample is assembled on the master node or not, because their exact values can be computed by using the moments that each worker node computes by using its partial sample. For estimating percentiles, it is desirable to assemble the entire sample at the master node. However, the larger the M, the more the cost of communicating and assembling the sample on the master node will be. This disclosure makes an assumption that if C value is larger than a certain threshold, then the average of the W estimates of a particular percentile, each of which is computed by a worker node from its local sample, is closer to the estimate of the percentile that would be computed by using the entire M-sized sample. This helps eliminate the O(M) communication cost and makes the solution scalable for larger M. The threshold on C is one of the tuning parameters that the user can specify.

When the user requests perturbation analysis, the work of simulating P perturbed samples is divided among W worker nodes. If P is greater than W, then each worker executes the algorithm of FIG. 6 in block 760 to simulate P/W number of perturbed samples, each of size M. Each worker computes the perturbed CDM estimates (moments and percentiles) for each of its samples and sends the estimates to the master node. If P is smaller than W, then each perturbed sample is generated just the way the unperturbed sample is generated—that is, each worker simulates M/W sample points of the perturbed sample and depending on the threshold on M/W, it either sends the whole perturbed sample to the master node or the summary statistics of its local portion to the master node. This process is repeated P times to simulate P perturbed samples. The master node then averages the perturbed estimates for all P samples to compute the mean and standard error of each moment and percentile estimate.

Scalability Results

Figure 8:
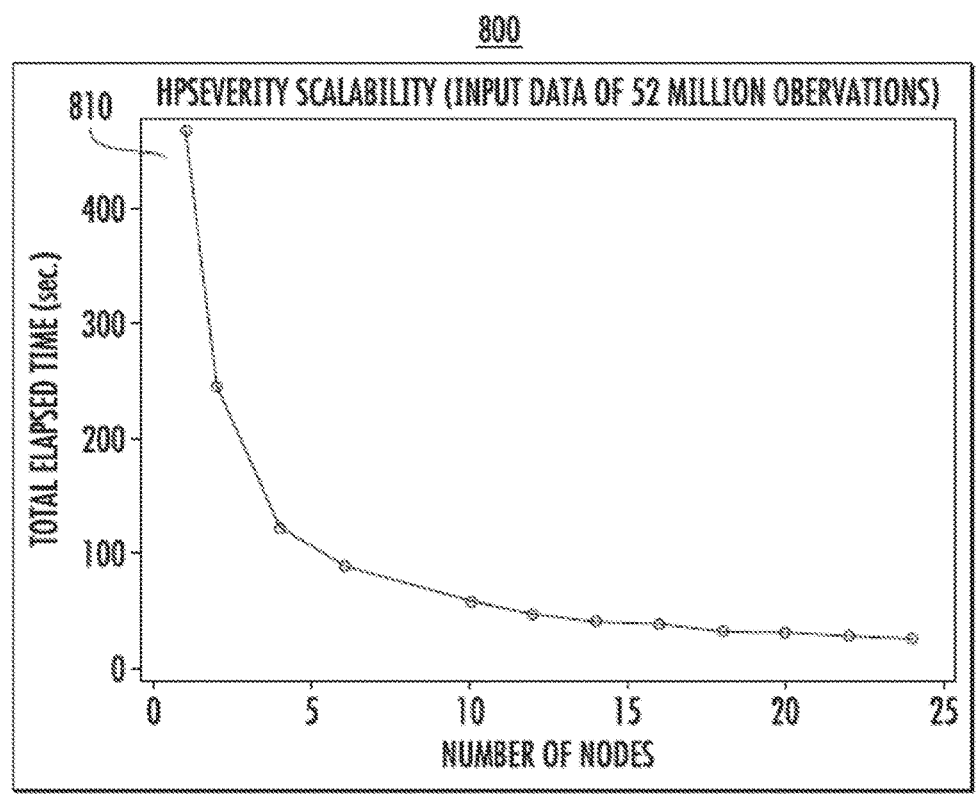
FIG. 8 illustrate an example of a set of scalability results for computing a compressed approximating parametric distribution in a parallel and distributed manner.
Figure 9:
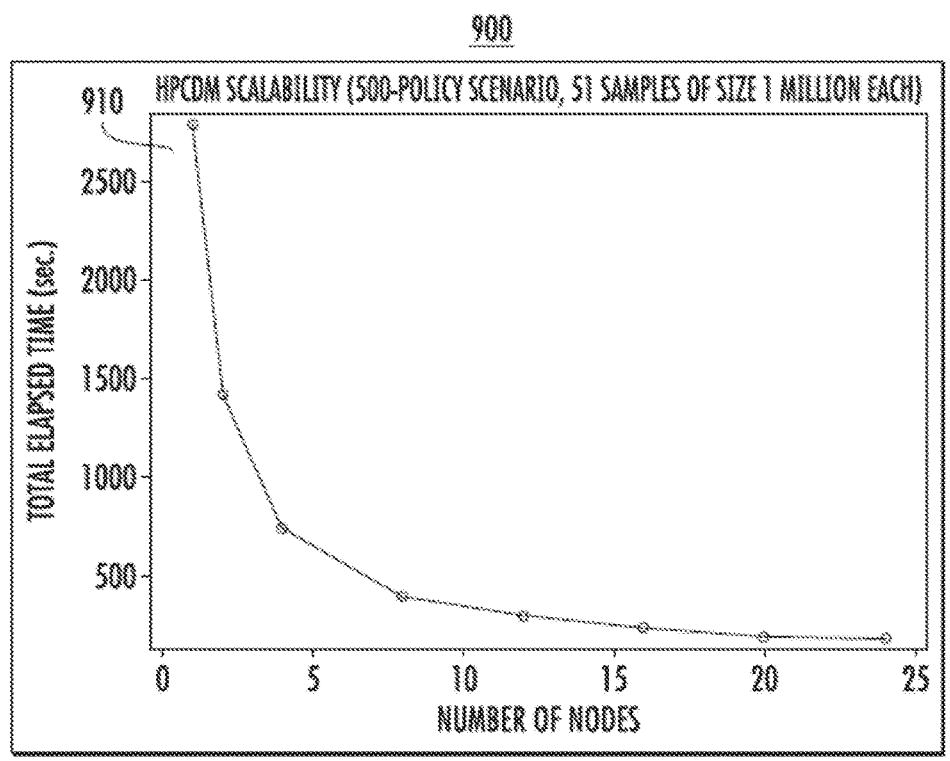
FIG. 9 illustrate an example of a second set of scalability results for the computation of an empirical CDM estimate.

FIG. 8 and FIG. 9 illustrate examples of scalability results for the computation of an empirical CDM estimate. FIG. 8 can relate to both severity model generation, as discussed with reference to FIG. 12, and the fitting of the approximating distribution.

The parallel and distributed algorithms of this disclosure may be implemented in procedures, for example, of the SAS® High Performance Econometrics product from SAS Institute, Inc. of Cary, N.C. PROC HPSEVERITY implements at least the high-performance severity modeling. PROC HPCDM implements at least the high-performance compound distribution modeling. Examples of the scalability results for PROC HPSEVERITY and PROC HPCDM are shown in FIG. 8 and FIG. 9, respectively. The plots 810, 910 shows the time it takes to finish the estimation task for a varying number of grid nodes while keeping everything else the same. Each grid node has 16 CPU cores. PROC HPSEVERITY times are for estimating eight severity models for eight probability distributions (e.g., Burr, exponential, gamma, generalized Pareto, inverse Gaussian, lognormal, Pareto, and Weibull) with an input severity data that contains approximately 52 million observations of left-truncated and right-censored loss values. Each severity model includes five regressors. PROC HPCDM times are for simulating 1 million yearly loss events to create and analyze one unperturbed sample and 50 perturbed samples for the ground-up loss and applying one loss adjustment function.

The example plots show that the estimation time can be reduced by using more nodes. The incremental benefit may decrease as the number of nodes increases because the cost of synchronizing communications among nodes may start to outweigh the amount of computational work that is available to each node.

Figure 10:
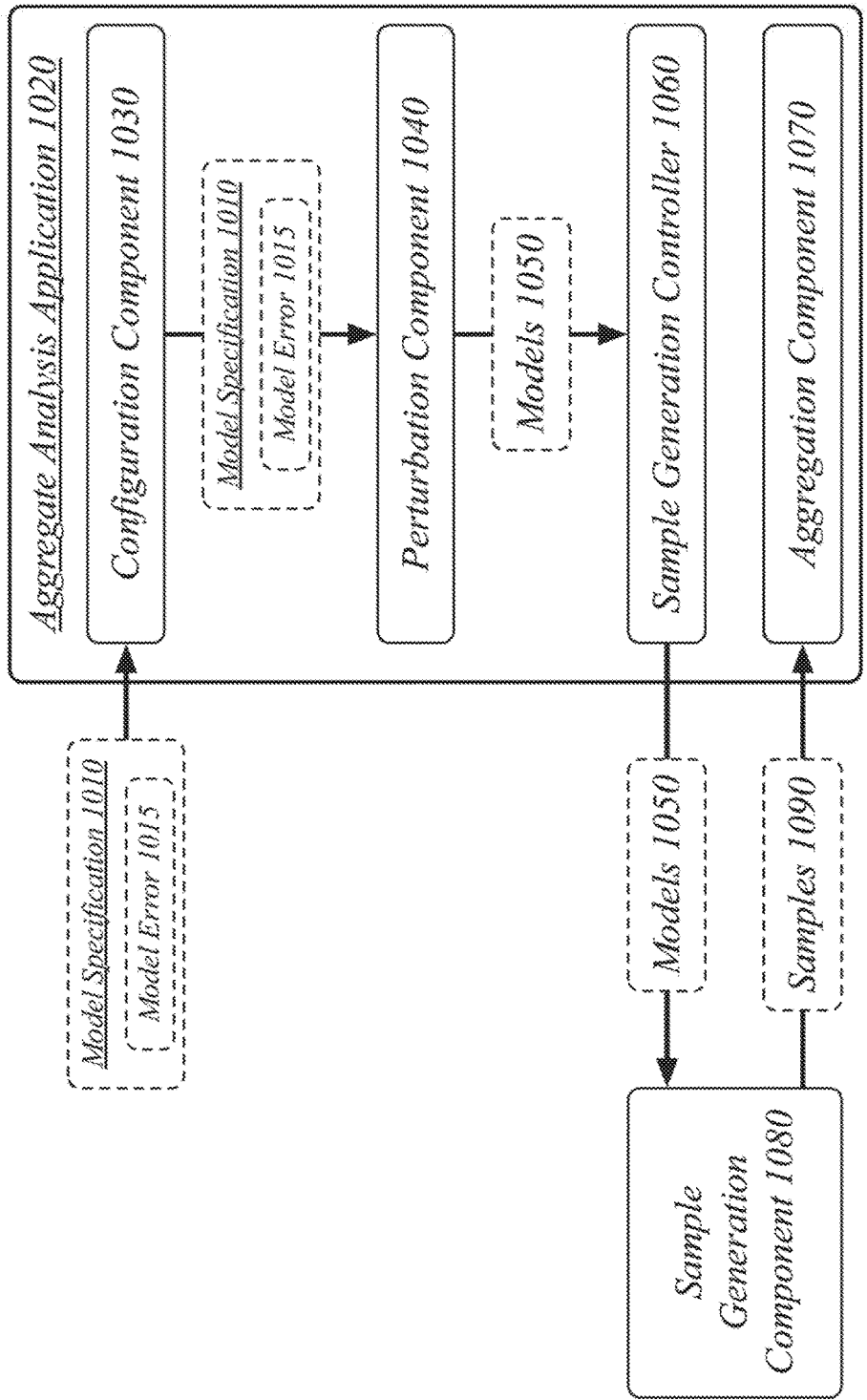
FIG. 10 illustrates an example of a block diagram for an aggregate distribution analysis system.

FIG. 10 illustrates a block diagram for an aggregate distribution analysis system 100. In one embodiment, the aggregate distribution analysis system 100 may include a computer-implemented system having an aggregate analysis application 1020. The aggregate analysis application 1020 may include a software application having one or more components.

The aggregate analysis application 1020 may be generally arranged to receive a model specification 1010 and to generate aggregate statistics for the model specification 1010. The aggregate analysis application 1020 may include a configuration component 1030, a perturbation component 1040, a sample generation controller 1060, and an aggregation component 1070. The aggregate analysis application 1020 may interact with a sample generation component 1080 operative to generate samples 1090 based on models 1050, the samples 1090 used to generate the aggregate statistics for the model specification 1010.

The configuration component 1030 may be generally arranged to receive a compound model specification 1010 comprising a frequency model and a severity model, the compound model specification 1010 including a model error 1015 including a frequency model error and a severity model error. The frequency model may correspond to a predicted loss frequency for an entity over a period of time, wherein the severity model may correspond to a predicted severity of loss for the entity, wherein the aggregate statistics and estimates of errors in the compound model specification correspond to a prediction and uncertainty of aggregate loss for the entity over the period of time. The frequency model and severity model may have been generated based on, at least in part, historic loss data for the entity.

The perturbation component 1040 may be generally arranged to generate a plurality of frequency models from the frequency model and the frequency model error by perturbing the frequency model according to the frequency model error. Each of the generated plurality of frequency models may correspond to an adjustment of the received frequency model according to a deviation from the received frequency model within the frequency model error.

The perturbation component 1040 may be generally arranged to generate a plurality of severity models from the severity model and the severity model error by perturbing the severity model according to the severity model error. Each of the generated plurality of severity models may correspond to an adjustment of the received severity model according to a deviation from the received severity model within the severity model error.

The perturbation component 1040 may generally be arranged to form a plurality of perturbed models 1050. Each of the plurality of perturbed models 1050 may include of one of the frequency models and one of the severity models.

The sample generation controller 1060 may be generally arranged to initiate the generation of a plurality of compound model samples 1090 from models 1050 comprising each of the plurality of frequency models and severity models. The sample generation controller 1060 may initiate the generation of the plurality of compound model samples 1090 using a sample generation component 1080. The sample generation component 1080 may be local to a same computer as the aggregate analysis application 1020, may be executed on a different computer as the aggregate analysis application 1020, and may be executed according to distributed computing techniques. In some embodiments, initiating the generation of a plurality of compound model samples 1090 may comprise the submission of models 1050 to a master grid node 130 of a grid computing system. In some embodiments, the sample generation component 1080 may comprise an element of the aggregate analysis application 1020.

The aggregation component 1070 may be generally arranged to generate aggregate statistics from the plurality of compound model samples. In some embodiments, the aggregation component 1070 may receive samples 1090 from the sample generation component 1080 for the generation of the aggregate statistics. In some example embodiments the aggregation component 1070 may be implemented completely on a same computer as one or more of the configuration component 1030, perturbation component 1040, and sample generation controller 1060. In some embodiments at least a portion of the aggregation component 1070 may be distributed among one or more worker grid nodes 150 of a grid computing system, the distributed aggregation component 1070 performing at least a portion of the generation of aggregate statistics on the worker grid nodes 150. The aggregate statistics may include an aggregate prediction and an error of the aggregate prediction, wherein the error of the aggregate prediction reflects an estimated error of the compound model specification 1010.

The compound model specification 1010 may include a plurality of covariates. The model error specification may include a plurality of covariate uncertainties. Perturbing the model may include perturbing the covariates according to the plurality of covariate uncertainties.

Perturbing the frequency model according to the frequency model error may include perturbing the covariates that are included in the frequency model according to the plurality of covariate uncertainties. Perturbing the severity model according to the severity model error may include perturbing the covariates that are included in the severity model according to the plurality of covariate uncertainties. As such, the error of the aggregate prediction may reflect the model error including the plurality of covariate uncertainties.

Figure 11:
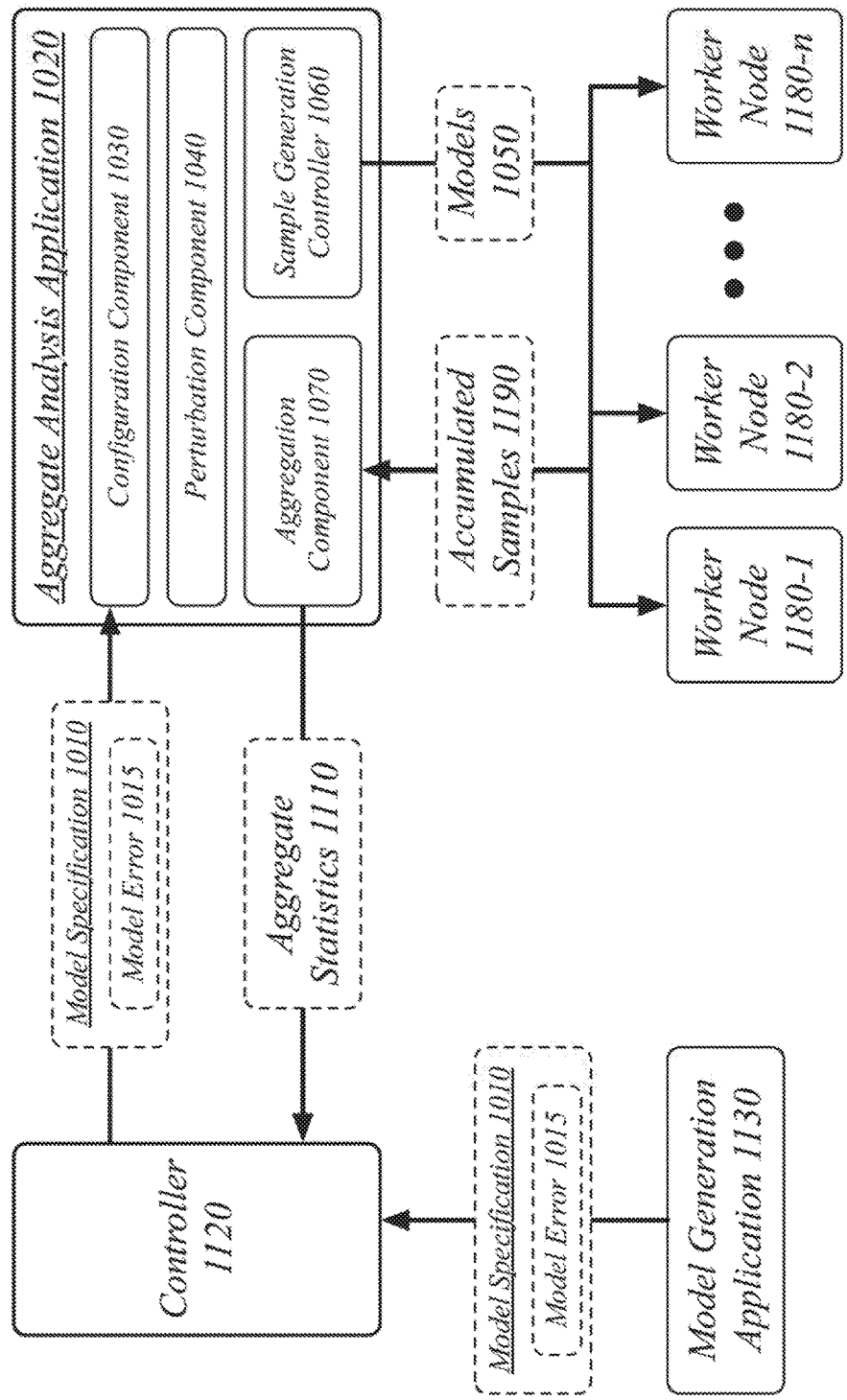
FIG. 11 illustrates an example of the distributed generation of samples among a plurality of worker nodes.

FIG. 11 illustrates the distributed generation of samples among a plurality of worker nodes 1180.

The sample generation controller 1060 may be generally arranged to divide the generation of the plurality of compound model samples 1090 among a plurality of distributed worker nodes 1180. The distributed worker nodes 1180 may be executed by a plurality of computing devices in a distributed computing environment such as a grid computing environment. The worker nodes 1180 may therefore correspond to the worker grid nodes 150 described with reference to FIG. 1, FIG. 2, and FIG. 3, for example. The distribution of data to worker nodes 1180, the gathering of data from worker nodes 1180, and the management of the operations of the worker nodes 1180 may therefore be performed by a master node on a separate device from the aggregate analysis application 1020. In some embodiments, the master node may also function as one of the worker nodes 1180.

Each of the plurality of worker nodes 1180 may generate a portion of the compound model samples 1090. Depending on the number of different models to be generated different schema may be used for dividing the work between the worker nodes 1180. The configuration component 1030 may receive a number of models to generate, the plurality of frequency models and the plurality of severity models generated based on the received number.

Where the number of models to be generated is at least equal in number to the plurality of distributed worker nodes 1180, each of the distributed worker nodes 1180 may be assigned one or more of the models. Each of the distributed worker nodes 1180 may be assigned one or more of the frequency models and/or one or more of the severity models. Each distributed worker node may generate all of the samples for the one or more models that it is assigned. The sample generation controller 1060 may determine that the number of models is at least equal in number to the plurality of distributed worker nodes 1180 and divide the generation of the plurality of compound model samples 1090 among the plurality of distributed worker nodes 1180 by assigning each of the plurality of distributed worker nodes 1180 the generation of all compound model samples 1090 for one or more of the plurality of frequency models and the plurality of severity models.

This may provide the advantage(s) that each of the distributed worker nodes 1180 may receive only the data for the one or more models that it is assigned without receiving the data for the one or more models that it is not assigned, with these models being assigned to other worker nodes. The sample generation controller 1060 may receive the models 1050 and arrange that each worker node of the worker nodes 1180 receive a portion of the models 1050 limited to those models assigned to that worker node. The sample generation controller 1060 may perform this arrangement by transmitting the models to the worker nodes 1180, by indicating to a master node what models are to be transmitted to each of the worker nodes 1180, but arranging that each of the worker nodes 1180 operate on a portion of the models generated at that worker node and therefore already present at the worker nodes 1180, or according to any other technique.

Where the number of models to be generated is less in number than the plurality of distributed worker nodes 1180 there are insufficient models for each of the distributed worker nodes 1180 to be exclusively assigned to the generation of all samples for one or more models. Each of the distributed worker nodes 1180 may therefore be assigned a portion of the samples for all of the models 1050. Rather than a division by model, each worker node will receive every model and will perform sample generation for all of the received models. The sample generation controller 1060 may determine that the number of models is fewer in number than the plurality of distributed worker nodes 1180 and divide the generation of the plurality of compound model samples 1090 across the plurality of distributed worker nodes 1180 by assigning each of the plurality of distributed worker nodes 1180 to generate a portion of samples for all of the plurality of frequency models and the plurality of severity models.

The aggregation component 1070 may be generally arranged to receive accumulated samples 1190 from the worker nodes 1180, the accumulated samples comprising a collection of all of the samples generated by each of the worker nodes 1180. The accumulated samples 1190 may correspond to the samples 1090 used by the aggregation component 1070 to generate aggregate statistics 1110.

A controller 1120 may submit a model specification 1010 including a model error 1015 to the aggregate analysis application 1020 and receive the aggregate statistics 1110 in response. The controller 1120 may correspond to a user device used by an operator of the aggregate distribution analysis system 100. The controller 1120 may comprise a software application implemented by the client computer 110 described with reference to FIG. 1, FIG. 2, and FIG. 3, for example. The aggregate analysis application 1020 may be implemented by the master grid node 130 and operate in response to the initiation by the controller 1120 of aggregate distribution analysis.

The model specification 1010 may be generated by a model generation application 1130. The model specification 1010 may be generated based on historic data for a person or other entity. The historic data may reflect losses experienced by the entity and be used to determine the historic distribution of the frequency of losses and the historic distribution of the severity of losses. The historic data may be used to generate a severity model and frequency model which comprise the model specification 1010.

Figure 12:
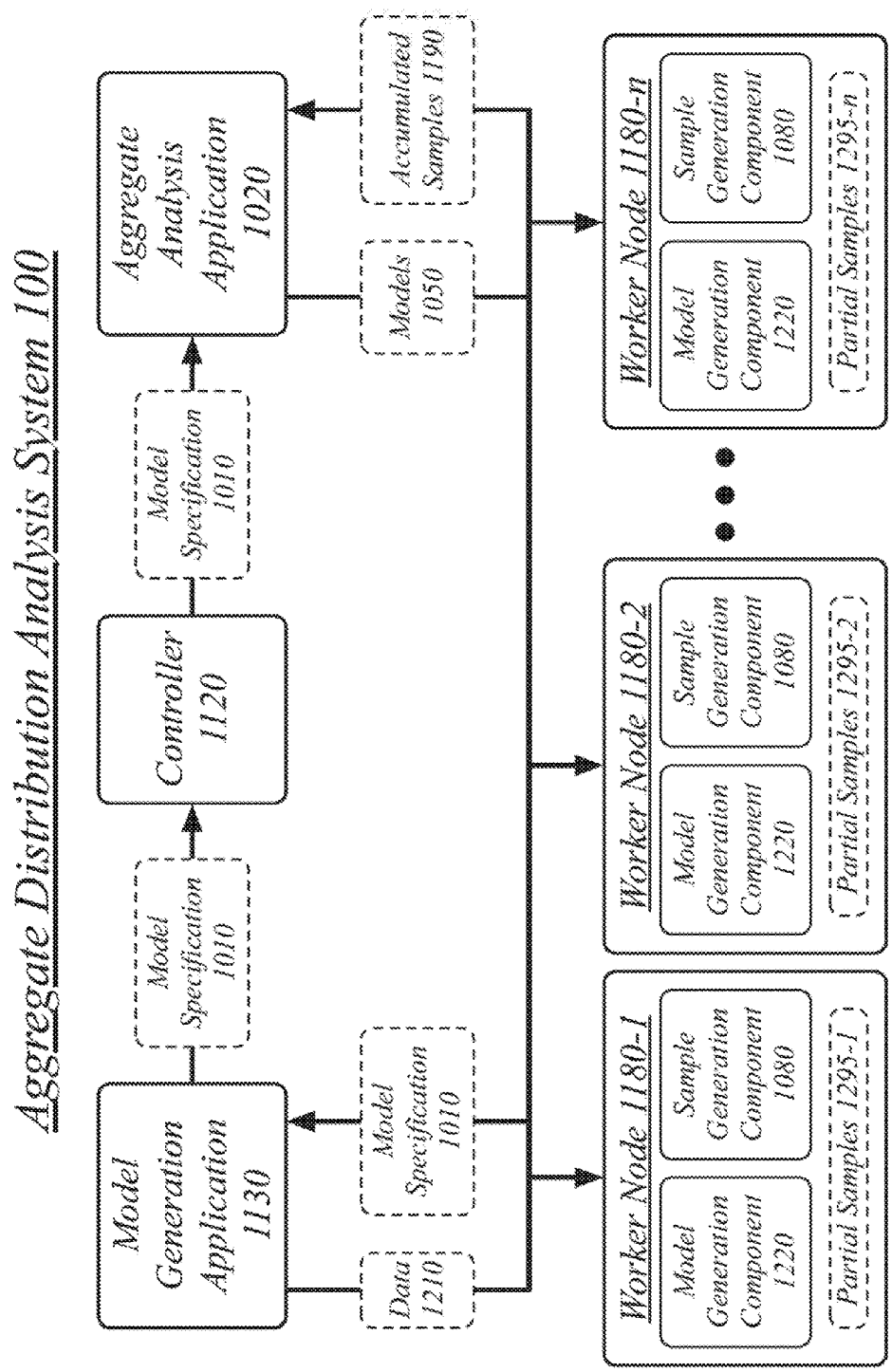
FIG. 12 illustrates an example of an embodiment of the distributed generation of compound model samples.

FIG. 12 illustrates an embodiment of the distributed generation of compound model samples 1090. FIG. 12 describes a system of fitting frequency and severity models. It will be appreciated that FIG. 12 and its associated text is included to provide context for the operation of the described embodiments.

A model generation application 1130 may submit data 1210 to a plurality of worker nodes 1180, the data 1210 reflecting historic data for an entity. The data 1210 may have been submitted to the model generation application 1130 by a user of the aggregate distribution analysis system 100. The submission of data 1210 to the model generation application 1130 and the initiation of model generation may be performed and managed by the controller 1120.

The model generation application 1130 may distribute the data 1210 to the worker nodes 1180. A model generation component 1220 on the worker nodes 1180 may generate the model specification 1010 based on the data 1210 distributed to the worker nodes 1180. The model generation components 1220 may work in coordination with each other to generate the model specification 1010 using distributed networking techniques. The model specification 1010 may be returned to the model generation application 1130 once generated.

The model specification 1010 may be transmitted or returned to the controller 1120 by the model generation application 1130. The controller 1120 may transmit the model specification 1010 to the aggregate analysis application 1020. The aggregate analysis application 1020 may generate models 1050 including the severity models and frequency models. The aggregate analysis application 1020 may distribute the models 1050 to a plurality of sample generation components 1080 on the distributed workers nodes 1180.

The plurality of sample generation components 1080 on the worker nodes 1180 may generate partial samples 1295, each of the sample generation components 1080 generating a portion of samples 1090. The worker nodes 1180 may each submit the partial samples 1295 to the aggregate analysis application 1020, the accumulation of the partial samples 1295 comprising accumulated samples 1190.

Figure 13:
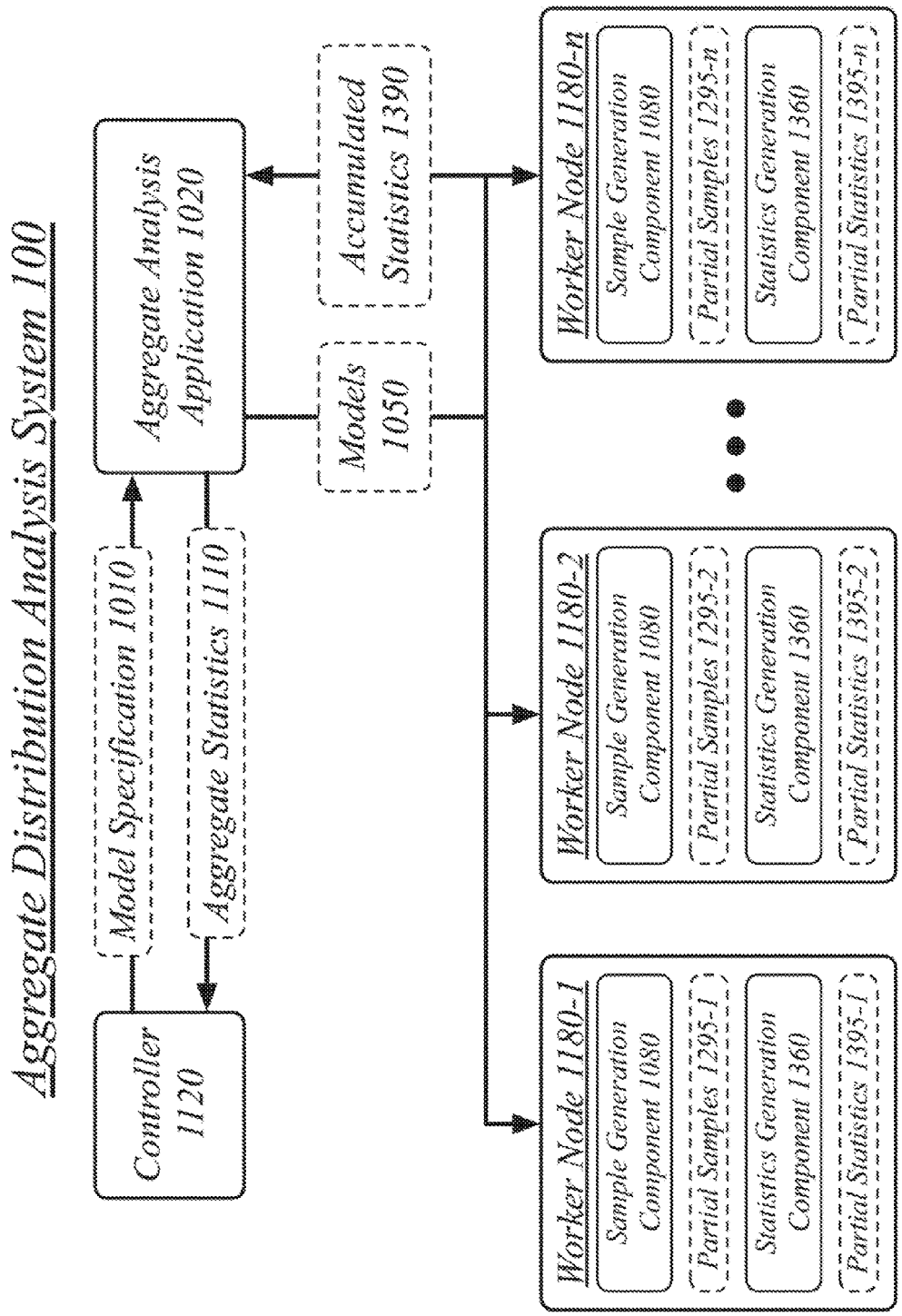
FIG. 13 illustrates an example of an embodiment of the distributed generation of aggregate statistics.

FIG. 13 illustrates an embodiment of the distributed generation of aggregate statistics 1110.

In some embodiments, the aggregate distribution analysis system 100 may at least partially distribute the work of generating the aggregate statistics 1110 from the partials samples 1295. The partial samples 1295 may use a significant amount of storage space and may therefore require a significant amount of network bandwidth and time to transfer from the worker nodes 1180 to the computing device implementing the aggregate analysis application 1020. It may therefore be useful to generate aggregate statistics 1110 without transmitting the partial samples 1295 off the worker nodes 1180.

To enable generating aggregate statistics 1110 without transmitting the partial samples 1295 off the worker nodes 1180, a plurality of statistics generation components 1360 may be implemented by the worker nodes 1180. The statistics generation components 1360 on each of the worker nodes 1180 may generate partial statistics based on the partial samples present on each worker node. The partial statistics may comprise the same statistics as would be generated for the accumulated samples 1190 but generated only for the partial samples present on the worker node. The partial statistics for a worker node may include alternative or additional statistics generated by the statistics generation component 1360 for use by the aggregate analysis application 1020 in generating the aggregate statistics 1110.

The aggregation component 1070 may be generally arranged to receive a plurality of partial statistics 1395 from each of the distributed worker nodes 1180 and generate the aggregate statistics 1110 from the plurality of partial statistics 1395 received from each of the distributed worker nodes 1180. Each of the partial statistics 1395 may include a representation of a distribution of the partial samples 1295 on each of the worker nodes 1180. The aggregate statistics 1110 may determine a representation of a distribution of the samples in aggregate based on a combination of the distributions of the received partial statistics 1395.

Figure 14:
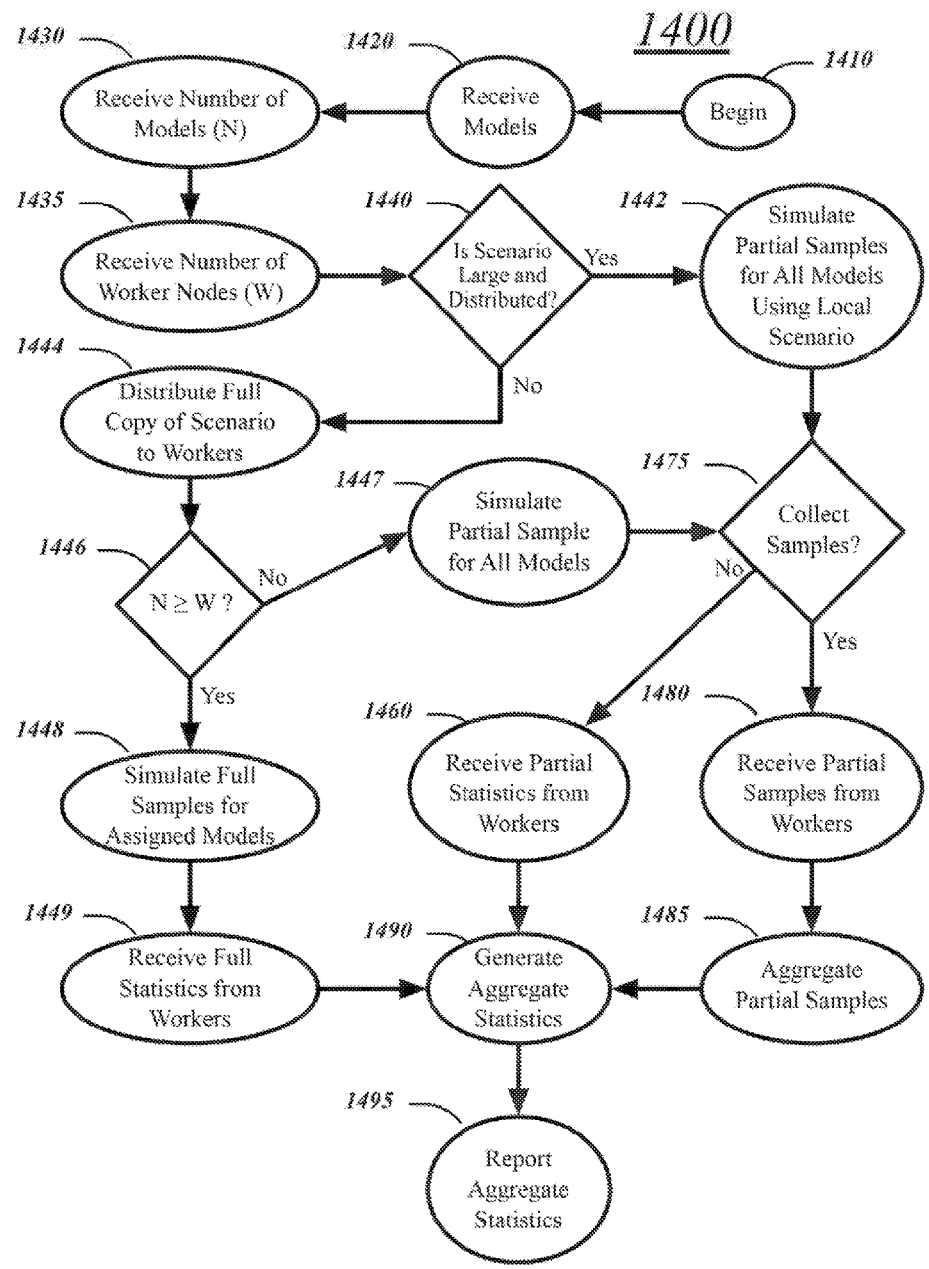
FIG. 14 illustrates an example of an embodiment of a logic flow for the system of FIG. 1.

FIG. 14 illustrates one embodiment of a logic flow 1400. The logic flow 1400 may be representative of some or all of the operations executed by one or more embodiments described herein.

In the illustrated embodiment shown in FIG. 14, the logic flow 1400 may begin at block 1410.

The logic flow 1400 may receive models at block 1420. The models may be received as a compound model specification 1010 comprising a frequency model and a severity model and a plurality of perturbed models 1050.

The logic flow 1400 may determine the number of received models (N) at block 1430. The number of models may include the number of perturbed models 1050 and the received model specification 1010 used to generate the perturbed models 1050 collectively equaling the number of models N.

The logic flow 1400 may receive a number of worker nodes (W) to be used at block 1435. The number of worker nodes may be determined according to user input, may be determined according to an available number of worker nodes in a distributed computing system or assigned in a distributed computing system. The number of worker nodes may be received automatically from a controller for a distributed computing system based on the availability of resources within the distributed computing system.

The logic flow 1400 may determine whether the scenario is large and distributed in block 1440. The scenario being distributed may correspond to the scenario data already being distributed among worker nodes. The scenario being large may correspond to a determination that an estimated time that would be used to move the scenario data back to a master node being larger than a configured or otherwise specified time allowed. As such, whether the scenario is large may be dependent on network configuration, network usage, and either user-specific or developer-configured standards for an allowable amount of network transmission time. If the scenario is large and distributed, then the logic flow 1400 may continue to block 1442 to simulate partial samples for all models using a local scenario. Otherwise, the logic flow 1400 may continue to block 1444 to distribute a full copy of the scenario to worker nodes.

The logic flow 1400 may simulate partial samples for all models using local scenario data at block 1442. The logic flow 1400 may then continue to decision block 1475.

The logic flow 1400 may distribute a full copy of the scenario to workers at block 1444.

The logic flow 1400 may determine whether the number of models is greater than or equal to (e.g., at least equal to) the number of worker nodes at block 1446. If so, the logic flow 1400 may continue to block 1448. Otherwise, the logic flow 1400 may continue to block 1447.

The logic flow 1400 may simulate partial samples for all models using the received full copy of scenario data at block 1447. Because the models may not be individually and uniquely assigned to particular workers, each worker can generate samples for every model, with the samples for each scenario distributed across all of the workers. The logic flow 1400 may then continue to block 1475.

The logic flow 1400 may simulate full samples for all of the assigned models, for each worker node, at block 1448. Because the number of models is at least equal to the number of workers, each worker can be restricted to working on generating a sample for just one or more of the models. Each worker node may then compute the statistics for the full sample for each assigned model. The logic flow 1400 may then receive the full-sample statistics from workers at a master node at block 1449. The logic flow 1400 may then proceed to block 1490 to generate aggregate statistics.

The logic flow 1400 may determine whether the samples are to be collected at a master node or controller computer at block 1475. This may be determined according to a user configuration of the aggregate distribution analysis system 100. If the samples are to be collected, the logic flow 1400 may continue to block 1480 and receive partial samples from workers. If the samples are not to be collected, the logic flow 1400 may continue to block 1460 and receive partial statistics from workers.

The logic flow 1400 may receive partial statistics from workers at block 1460. Where each of the workers generated samples for a particular one or more models the partial statistics may comprise a set of statistics for each model. Because each model uniquely has samples generated at a particular worker, every model is able to have its individual statistics generated based entirely on samples present on a particular worker.

The logic flow 1400 may receive partial samples from workers at block 1480.

The logic flow 1400 may aggregate the partial samples at block 1485. Aggregating the partial samples may comprise reorganizing the partial samples into units for the generation of statistics. For instance, the partial samples may be reorganized into groups organized by the model based on which they were generated.

The logic flow 1400 may generate aggregate statistics at block 1490. Where partial samples were received from the workers the aggregate statistics may be generated according to the accumulated samples. Where partial statistics were received from the workers the aggregate statistics may be generated according to the accumulated statistics. Where full-sample statistics were received from workers the aggregate statistics may be copies of the full-sample statistics.

The logic flow 1400 may report the aggregate statistics at block 1495.

FIG. 15 illustrates one embodiment of a logic flow 1500. The logic flow 1500 may be representative of some or all of the operations executed by one or more embodiments described herein.

In the illustrated embodiment shown in FIG. 15, the logic flow 1500 may receive a compound model specification 1010 comprising a frequency model and a severity model, the compound model specification 1010 including a model error 1115 comprising a frequency model error and a severity model error at block 1502.

The logic flow 1500 may generate a plurality of frequency models from the frequency model and the frequency model error by perturbing the frequency model according to the frequency model error, wherein each of the generated plurality of frequency models corresponds to an adjustment of the received frequency model according to a deviation from the received frequency model within the frequency model error at block 1504.

The logic flow 1500 may generate a plurality of severity models from the severity model and the severity model error by perturbing the severity model according to the severity model error, wherein each of the generated plurality of severity models corresponds to an adjustment of the received severity model according to a deviation from the received severity model within the severity model error at block 1506.

The logic flow 1500 may generate a plurality of compound model samples 1190 from each of the plurality of frequency models and severity models at block 1508.

The logic flow 1500 may generate aggregate statistics 1110 from the plurality of compound model samples 1190 at block 1510.

The embodiments are not limited to this example.

Compressed Approximating Parametric Distribution Generation

Figure 16:
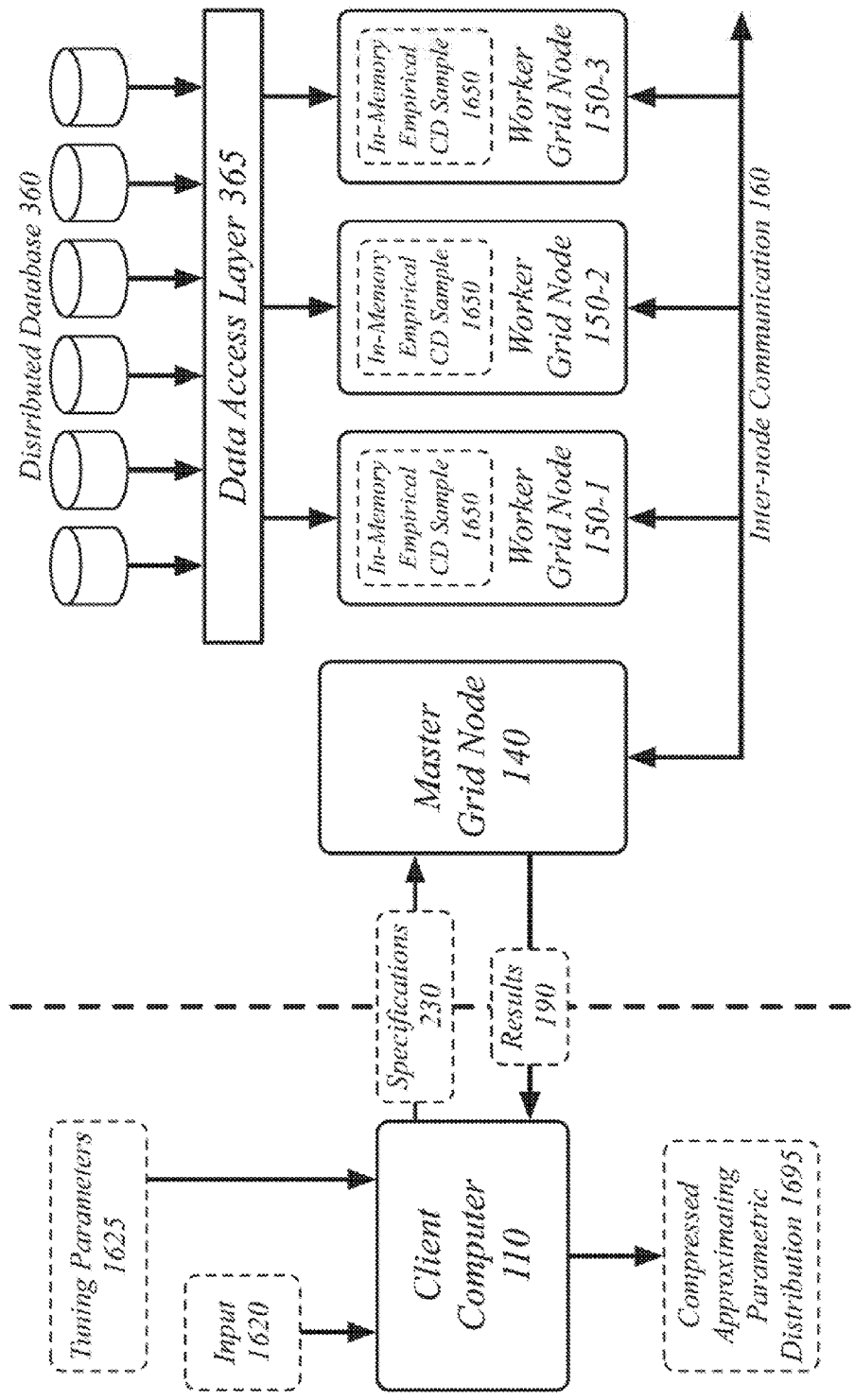
FIG. 16 illustrates an example of a computing architecture for an aggregate distribution analysis system in which a compressed approximating parametric distribution is produced.

FIG. 16 illustrates an example of a computing architecture for an aggregate distribution analysis system 100 in which a compressed approximating parametric distribution 1695 is produced. The aggregate distribution analysis system 100 may be used for compressing a large, empirical sample of a compound probability distribution into an approximate parametric distribution by using parallel and distributed processing.

Some interesting aspects of the disclosed system include the following features:

1.1—The disclosed system can estimate a parametric distribution approximation to the compound probability distribution that cannot be computed in a closed form. When estimated by using a distance-based estimator that minimizes the distance between empirical (nonparametric) and parametric cumulative distribution functions (CDF), the parametric distribution serves as a good approximation from which quantities of interest such as quantiles can be estimated with sufficient accuracy.

1.2—The intractability of the convolution operation that defines the compound distribution precludes its computation in a closed form. So often the compound distribution is represented by a large, simulated empirical sample. It is in such cases, for example, that some of the system's novelty and benefits can be realized. The disclosed method essentially compresses the compound distribution's representation from the large set of numbers in the empirical sample to a much smaller set of numbers that contains just the parameter estimates of the approximating distribution. After the approximating distribution is estimated, the large, empirical sample need not be retained. All subsequent operations, especially the operations that require computation of quantiles from the compound distribution, can be carried out by using the highly parsimonious parametric approximation.

1.3—The disclosed system is especially efficient when the large empirical sample is distributed across a cluster of computers, each of which stores a portion of the empirical sample. Instead of bringing the whole sample back to one computer and storing it there, the system estimates the parametric distribution approximation in a parallel and distributed fashion that works on the local portion of the empirical sample.

1.4—As an embodiment of the estimation method, the disclosed system includes a nonlinear optimization technique that uses an objective function that minimizes the distance between the nonparametric (empirical) and parametric estimates of the cumulative distribution function (CDF), which in turn ensures that the quantiles estimated from the parametric approximation are accurate approximations of the quantiles that would be estimated from the nonparametric (input) sample.

1.5—Further, as an embodiment of the approximating parametric distribution, the system can estimate and compare two types of mixture distributions. The first type involves two components such that one component attempts to approximate the main (body) region of the distribution and the other component attempts to approximate the tail region of the distribution. Each component can have a different, user-specified probability distribution. The other type of mixture distribution is a mixture of two or more component distributions, each of which has a user-specified distribution. The number of components in the mixture are estimated by conducting a search over the set [2,N], where N is the maximum number of components that the user specifies. The search uses a fit statistic that accounts for both accuracy and complexity of the model. The system chooses the smallest number of components that maximizes the fit statistic.

For an example, an economic capital model (ECM) of an entity typically estimates the worst-case, enterprise-wide, aggregate loss that the entity expects to incur in a particular time period. The estimate of the enterprise-wide aggregate loss is used for computing minimum capital requirements that are needed not only to keep the entity solvent and profitable but also to satisfy industry regulations such as Basel III and Solvency II. The enterprise-wide aggregate loss is computed by aggregating losses from different lines of business or risk categories. The loss for each line of business is in turn estimated by what is called a compound probability distribution, which is the distribution of a sum of random variables that represent the severity (magnitude) of an individual loss such that the number of terms in the summation is also a random variable that represents the frequency (count) of loss events. A compound distribution computation requires a mathematical operation called convolution and in all but some simple cases, it is not computable in a closed form—that is, it cannot be expressed as a mathematical formula that can be easily computed by a computer. So it is estimated by a Monte Carlo simulation method that generates a large, empirical sample from the distribution. To increase the chance of capturing all the salient features of the distribution, especially those in the tail region, the empirical sample may need to contain tens to hundreds of millions points, for example. One of the key steps in the ECM estimation process may involve the estimation of a large number of percentiles from the compound distribution of each line of business or risk category. A typical ECM application may need to compute one million or more percentiles from each compound distribution. Searching for millions of percentiles in multiple very large empirical samples becomes computationally expensive. Also, it is costly to store the compound distribution for multiple lines of business because the distribution is defined by the entire empirical sample. The percentile computations and storage usage become even more challenging when the compound distribution's empirical sample is simulated and distributed on multiple computers. The disclosed system attempts to alleviate both problems by using a parallel and distributed algorithm to estimate an approximating parametric distribution to the distributed empirical sample of the compound distribution. The embodiments are not limited to this example. Other example applications of one or more systems described herein may be in the realms of scientific data, research data, academic data, communication data, data from physical objects, or data relating to various devices or instruments, for instance.

The disclosed solution finds a parametric distribution that serves as the best approximation to the empirical sample of the compound distribution. The parametric distribution is defined by a set of a few parameters; so it is a highly parsimonious approximation that can be stored in a much smaller space as compared to the empirical sample. This is equivalent to compressing the information that is stored in the large empirical sample to a set of few numbers. The time it takes to compute the quantile from the approximating parametric distribution is expected to be smaller than the time it takes to compute an equivalent percentile from the empirical sample, especially when the empirical sample is simulated and stored in a distributed fashion across multiple computers. In fact, the disclosed system is beneficial especially for such cases, because the system computes the parametric approximation by collocating the computations with the local portion of the sample thereby avoiding the need to gather the entire sample on any one computer. The computers communicate with each other only a small set of parameter values. This design reduces the cost of communication and makes the system scalable to large empirical samples and large number of computers. Parametric approximation of the distributed empirical sample further avoids the need to implement complex, distributed algorithms for computing percentiles or other statistics from the distributed sample.

The parametric distribution can approximate the empirical sample as accurately as possible. To that end, the system can estimate the parameters of the approximating distribution by using a nonlinear optimizer that minimizes a distance-based objective function. Such objective functions can be derived from the distance between the empirical (non-parametric) distribution function and the parametric cumulative distribution function (CDF). Minimizing them in turn ensures that the quantile that is computed from the parametric distribution is a close approximation of the percentile that would be computed by using the full empirical sample. Further, to account for the possibility of a multimodal compound distribution, the system can use different types of mixture distributions as approximating distributions.

The disclosed parallel and distributed solution can be implemented at least by using the computing architecture as shown in FIG. 16. It will be appreciated that the computing architecture shown in FIG. 16 may generally correspond to the computing architecture in accordance with FIG. 1, FIG. 2, and FIG. 3, for example, with the results 190 producing a compressed approximating parametric distribution 1695. The empirical sample of the compound distribution (CD) is assumed to have been simulated in a distributed fashion such that each node of the grid appliance stores a portion of the sample.

The general flow of the solution is as follows:

1. The client computer 110 receives user input, which can include the following:

Candidate approximating distributions: This includes a list of distributions that can contain system-provided mixture distributions as well as user-defined probability distributions. Users can define their own custom distributions. A custom distribution is a programmatic definition of the probability density function (PDF) and the cumulative distribution function (CDF) (or its variant, the survival distribution function (SDF)) along with any restrictions on the parameter ranges and a parameter initialization program.

Fit statistic: A fit statistic measures how well a model fits the data. For example, the user can choose among the several options that the system provides.

Tuning parameters 1625: The process of estimating the parameters of a particular model is guided by several tuning parameters 1625. These include parameters that control the behavior of the nonlinear optimizer, parameters that control the model search process, and parameters that control the model initialization (that seeds the optimizer). These also include the number of grid nodes to use and the number of parallel threads of computations to use on each node. The system chooses appropriate default value when the user does not provide a value for a tuning parameter.

2. Client computer 110 parses the user's input and communicates the problem specification to the master grid node 140 of the grid appliance.

3. The master grid node 140 communicates the problem specification to the worker grid nodes 150.

Figure 17:
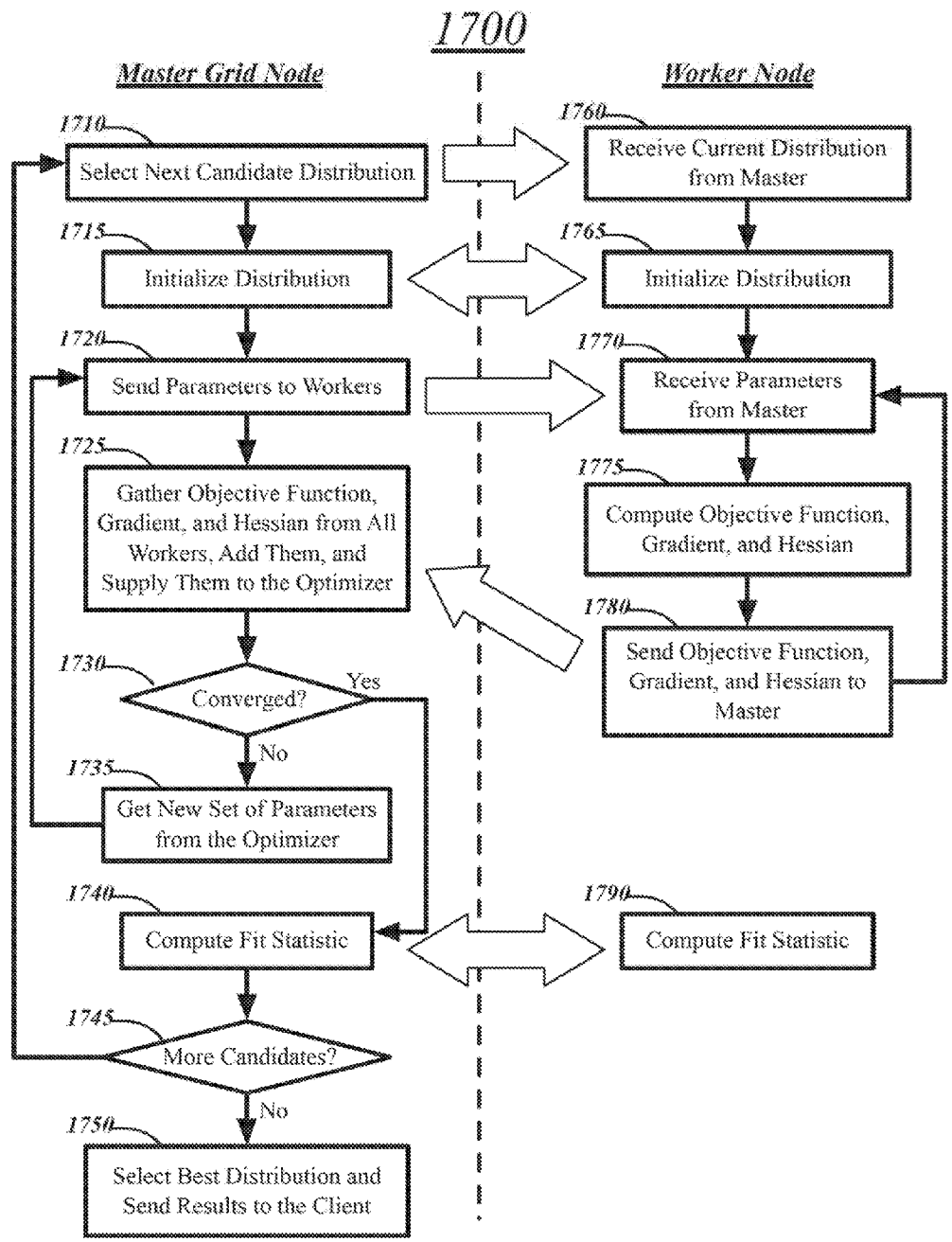
FIG. 17 illustrates an example of a logic flow for computing a compressed approximating parametric distribution in a parallel and distributed manner.

4. For each candidate approximating distribution, the master grid node 140 conducts the distributed nonlinear optimization process that is illustrated in FIG. 17. It first initializes the parameter values in cooperation with the worker grid nodes 150. It then iterates over various parameter values in search of the values that minimize a distance-based objective function. In each iteration, values of the objective function and its derivatives are computed by worker nodes for their local portion of the empirical sample. The master grid node 140 aggregates these values from all worker grid nodes 150 and supplies them to the nonlinear optimization algorithm, which uses them to decide the next best set of parameter values to try. If the iterations converge to an optimal set of parameter values, the master grid node 140 computes the fit statistic, which might require aggregation of the fit statistic values that each worker node computes for its local portion of the sample. The process repeats for all candidate distributions and the distribution with the best fit statistic is chosen as the approximating distribution.

5. The master grid node 140 communicates the best approximating distribution and its parameter values back to the client computer 110, which stores it as a compressed parametric representation of the distributed empirical sample. This best approximating distribution is then used for all subsequent operations on the compound distribution such as computing its quantile (inverse-of-CDF).

One of the key parts of the disclosed system is the form of the approximating parametric distribution. To account for the possibility of a multimodal compound distribution, the disclosed system recommends that the list of candidate distributions include two types of mixture distributions. The first type is referred to as mixed-tail distribution. It involves two components such that one component attempts to approximate the main (body) region of the distribution and the other component attempts to approximate the tail region of the distribution. Each component can have a different, user-specified probability distribution. This type of mixture is defined by using the following notation:

g(x): PDF of the body distribution
G(x): CDF of the body distribution
h(x): PDF of the tail distribution
H(x): CDF of the tail distribution
θ: scale parameter for the body distribution
Ω: set of non-scale parameters for the body distribution
ζ: shape parameter for the GDP tail distribution
$x_r$: normalized value of the response variable at which the tail stars
$p_n$: mixing probability Given these notations, the PDF f(x) and the CDF F(x) of the mixed-tail distribution are defined as:

$$f(x) = \begin{cases} \frac{p_n}{G(x_b)} g(x) & \text{if } x \le x_b \\ p(1-p_n)h(x-x_b) & \text{if } x > x_b \end{cases}$$

$$F(x) = \begin{cases} \frac{p_n}{G(x_b)} G(x) & \text{if } x \le x_b \\ p_n + (1-p_n)H(x-x_b) & \text{if } x > x_b \end{cases}$$

where $x_b = \theta x_r$ is the value of the random variable at which the tail starts. The parameters of this distribution are θ, Ω, ζ, $x_r$, and $p_n$.

The other type of mixture distribution is a mixture of two or more components, each of which can have a different, user-specified distribution. Formally, if $f_i$ and $F_i$ denote the PDF and CDF, respectively, of component distribution i and $p_i$ represents the mixing probability that is associated with component i, then the PDF and CDF of the finite mixture of K distribution components are $$f(x; \Theta, P) = \sum_{i=1}^{K} p_i f_i(x; \Theta_i)$$

$$F(x; \Theta, P) = \sum_{i=1}^{K} p_i F_i(x; \Theta_i)$$

where $\Theta_i$ denotes the parameters of component distribution i and Θ denotes the parameters of the mixture distribution, which is a union of all the $\Theta_i$ parameters. P denotes the set of mixing probabilities. All mixing probabilities must add up to one (1)

$$\left(\sum_{i=1}^{K} p_i = 1\right).$$

A homogeneous mixture, in which all components have a distribution from the same parametric family, is often a good candidate to try. An optimal number of components (K) also needs to be estimated. One possibility is to conduct a search over the set [2,N], where N is the maximum number of components to that the user specifies. The search uses a fit statistic that accounts for both accuracy and complexity of the model. The mixture that maximizes the fit statistic with smallest number of components is chosen as the best mixture.

Worker grid nodes 150 may receive the empirical CD sample and store it in the distributed database 360. During processing of the empirical CD sample, each of the worker grid nodes 150 may make a copy of the information from distributed database 360 to their main memory (e.g., RAM) to form in-memory empirical CD sample 1650. The in-memory empirical CD sample 1650 on each of the worker grid nodes 150 may comprise only a portion of the total empirical CD sample, with each of the worker grid nodes 150 operating on only a subset of the empirical CD sample. Alternatively, the in-memory empirical CD sample 1650 on each of the worker grid nodes 150 may comprise a full copy of the total empirical CD sample.

FIG. 17 illustrates an example of a logic flow 1700 for computing a compressed approximating parametric distribution 1695 in a parallel and distributed manner. The key is to distribute the total work among the worker nodes such that the distribution calculations are computed in a scalable manner. The following describes various operations of the algorithm.

The master grid node 140 may select a candidate distribution at block 1710. In a first time through the iterated process, an initial candidate distribution may be selected from a plurality of candidate distributions. In subsequent times through the iterated process of logic flow 1700, a next candidate distribution may be selected from the plurality of candidate distributions.

The master grid node 140 may initialize the distribution at block 1715. Initializing the distribution may comprise setting initial parameter values in coordination with the worker nodes. The master grid node 140 may send the parameters to the worker grid nodes 150 at block 1720.

The master grid node 140 may gather the objective function, gradient, and Hessian (matrix of second-order derivatives) from all of the worker grid nodes 150, add them, and supply them to the optimizer at block 1725. The master grid node 140 may enquire the optimizer whether the optimization process has converged at block 1730. Convergence implies that an optimal set of parameter values has been found. If converged, the logic flow 1700 may continue to block 1740. If not, the logic flow 1700 may continue to block 1735, where the master grid node 140 may get a new set of parameters from the optimizer and loop back to block 1720 to send the new set of parameters to the worker grid nodes 150. The master grid node 140 may compute a fit statistic by using the converged, optimal set of parameter values at block 1740.

The master grid node 140 may determine whether there are more candidate distributions at block 1745. If so, the logic flow 1700 may loop back to block 1710 to select the next candidate distribution. If not, the master grid node 140 may select the best distribution based on the fit statistics calculated at block 1740 and send the results to the client computer 110 at block 1750.

Each of the worker grid nodes 150 may receive the current candidate distribution from the master grid node 140 at block 1760. Each of the worker grid nodes 150 may compute a local set of initial parameter values by using the local portion of the compound distribution sample. Each of the worker grid nodes 150 may employ a user-specified parameter initialization program. Each of the worker grid nodes

150 may initialize the distribution in coordination with the master grid node 140 at block 1765. Each of the worker grid nodes 150 may receive parameters from the master grid node 140 at block 1770.

Each of the worker grid nodes 150 may locally compute the objective function, gradient, and Hessian at block 1775 by using the local portion of the compound distribution sample. Each of the worker grid nodes 150 may send their locally-computed objective function, gradient, and Hessian to the master grid node 140 at block 1780.

Each of the worker grid nodes may compute the fit statistics at block 1790 by using the local portion of the compound distribution sample. Computing the fit statistics may be performed in coordination with the master grid node 140 and may include the transmission of locally-computed fit statistics to the master grid node 140 from each of the worker grid nodes 150.

Figure 18:
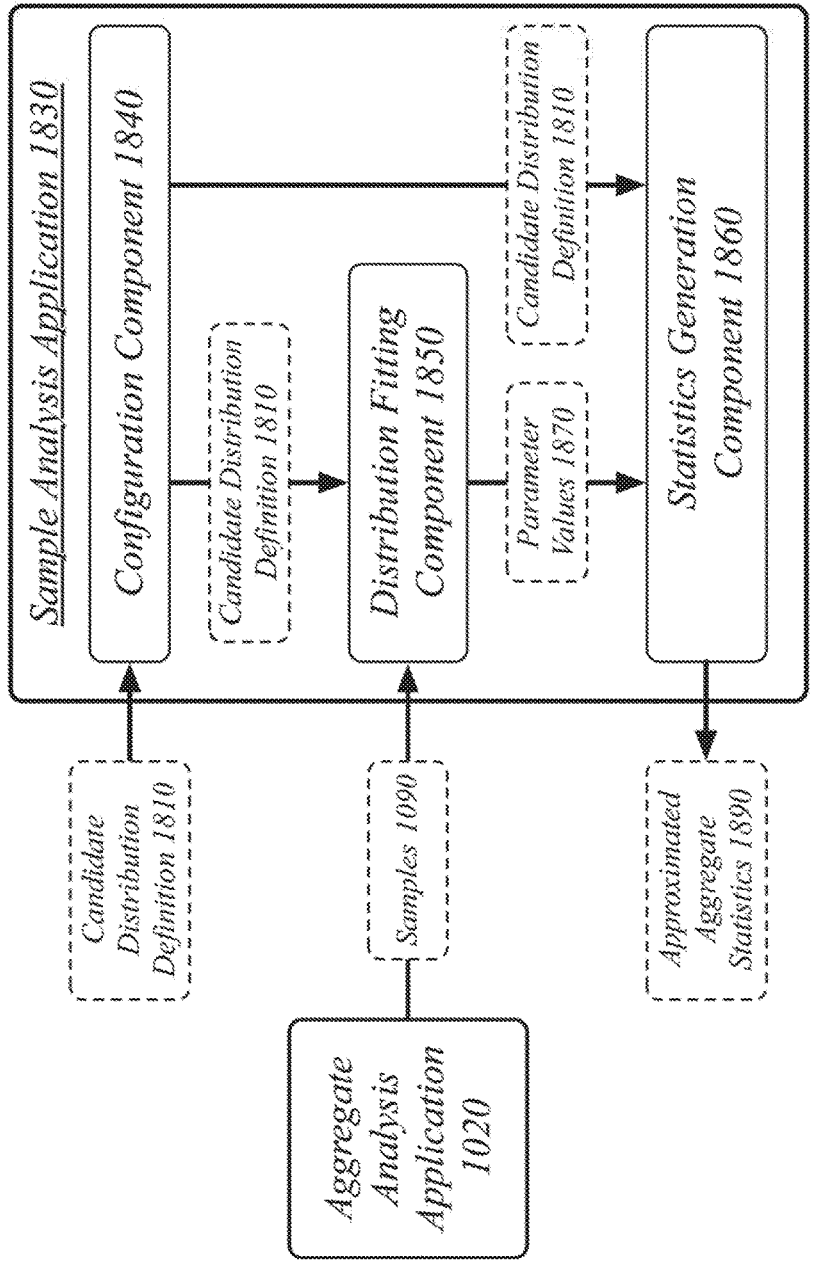
FIG. 18 illustrates an example of a block diagram for the aggregate distribution analysis system generating approximated aggregate statistics.

FIG. 18 illustrates a block diagram for an aggregate distribution analysis system 100. In one embodiment, the aggregate distribution analysis system 100 may include a computer-implemented system having an aggregate analysis application 1020. The aggregate analysis application 1020 may include a software application having one or more components.

The sample analysis application 1830 may be generally arranged to receive a plurality of samples 1090 and a candidate distribution definition 1810 and to generate approximate aggregate statistics 1890 from the plurality of samples 1090 based on the candidate distribution definition 1810. The sample analysis application 1830 may include a configuration component 1840, a distribution fitting component 1850, and a statistics generation component 1860. The sample analysis application 1830 may receive samples 1090 from an aggregate analysis application 1020. It will be appreciated, however, that the samples 1090 may be generated according to any technique and not just those discussed herein. In some embodiments where the aggregate analysis application 1020 and sample analysis application 1830 are used together, the aggregate analysis application 1020 and sample analysis application 1830 may comprise a combined application with a common configuration component corresponding to both the configuration component 1030 and configuration component 1840.

The configuration component 1840 may be generally arranged to receive a candidate distribution definition 1810. The candidate distribution definition 1810 may comprise a combination of at least two component distributions. The candidate distribution definition 1810 may comprise one or more parameters. The candidate distribution definition 1810 may comprise a combination of two candidate distribution definitions, the two candidate distribution definitions comprising a main region distribution and a tail region distribution.

The candidate distribution definitions may comprise a finite mixture of multiple components, each with a distribution from a family of different parametric families. The candidate distribution definitions may be selected from a zero-inflated family, which is a mixture of a Bernoulli distribution for zero values and a parametric family for non-zero values. This may be useful because the compound distribution sample might contain a lot of zeroes.

The candidate distribution definition 1810 may comprise a combination of a determined number of identical component distributions. The determined number of the identical distributions may be determined according to a component-number search over a range of using two of the identical distributions and using a user-defined maximum number of the identical distributions. The user-defined maximum may be configured by the user using the configuration component 1840. The component-number search may be performed using a criteria that selects a minimum number of the identical distributions that maximizes a fit statistic.

The distribution fitting component 1850 may be generally arranged to receive a plurality of model samples 1090, the model samples 1090 implying a non-parametric distribution of aggregate loss events. The distribution fitting component 1850 may determine parameter values 1870 for the one or more parameters of the candidate distribution definition 1810. The parameter values 1870 may be determined by optimizing a non-linear objective function through a search over a multidimensional space of parameter values. The objective function may calculate a distance between the non-parametric distribution of the loss events as implied by the model samples 1090 and a parametric distribution determined by application of potential parameter values to the candidate distribution definition 1810.

The model samples may comprise simulated events generated according to a model. The model may be defined according to a model specification 1010. The model may be generated from historical events. The simulated events may comprise simulated losses for an entity. The historical events may comprise historical losses for the entity.

The statistics generation component 1860 may be generally arranged to generate approximated aggregate statistics 1890 for the plurality of model samples 1090 based on an optimized parametric distribution defined by the candidate distribution definition 1810 and the determined parameter values 1870 and report the approximated aggregate statistics 1890. The approximated aggregate statistics 1890 may be reported to a user of a client computer 110. The approximated aggregate statistics 180 may include approximated quantiles of the parametric distribution of the model samples 1090.

Figure 19:
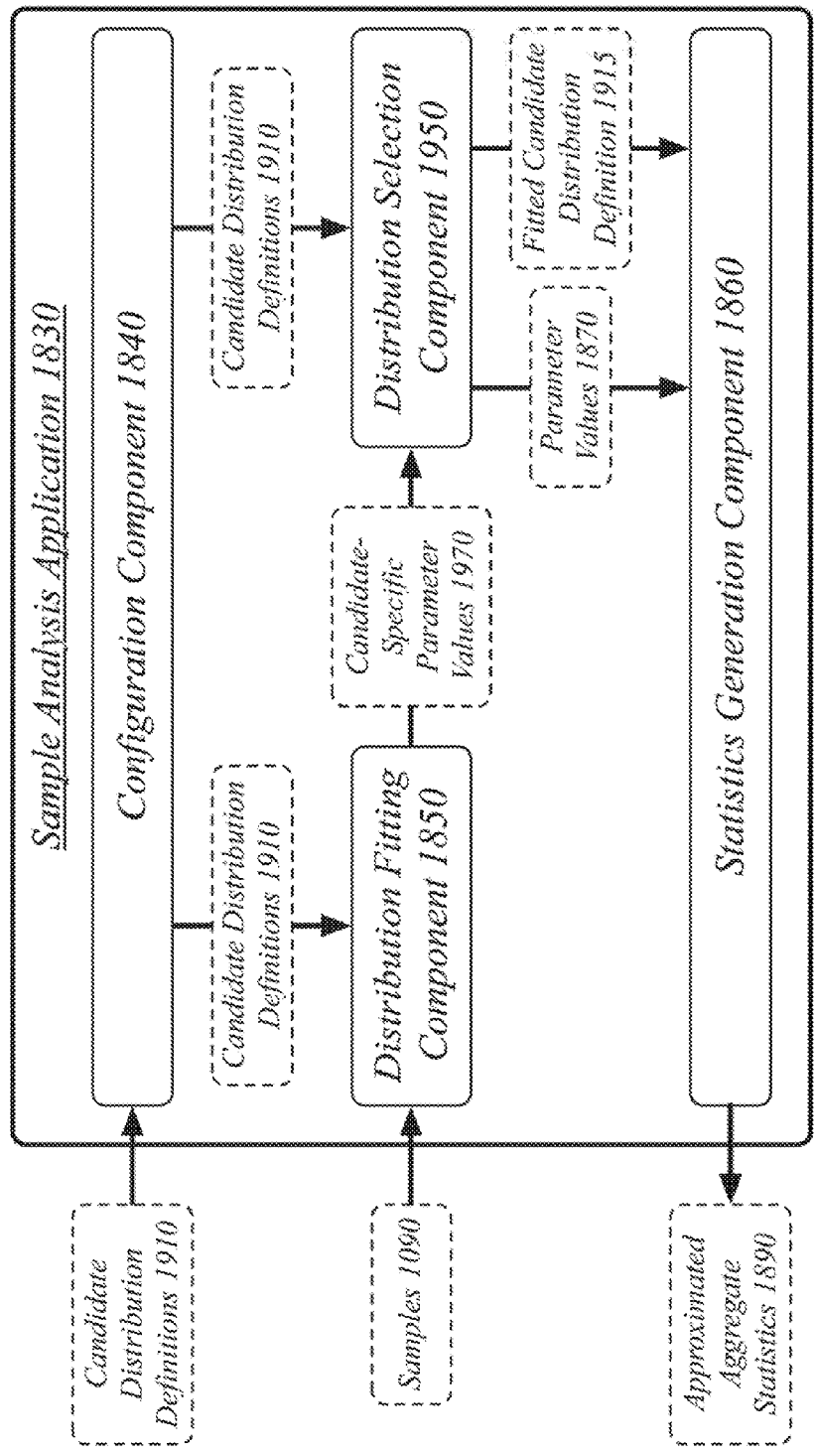
FIG. 19 illustrates an example of the examination of multiple different candidate distribution definitions.

FIG. 19 illustrates an example of the examination of multiple different candidate distribution definitions.

The configuration component 1840 may be generally arranged to receive a plurality of candidate distribution definitions 1910. The user of the aggregate distribution analysis system 100 may specify the plurality of candidate distribution definitions 1910 using a user interface to the configuration component 1840.

The distribution fitting component 1850 may be generally arranged to search for candidate-specific parameter values 1970 for each of the plurality of candidate distribution definitions 1910 and determine candidate-specific parameter values 1970 for at least two or more candidate distribution definitions of the plurality of candidate distribution definitions 1910.

The sample analysis application 1830 may further comprise a distribution selection component 1950. The distribution selection component 1950 may be generally arranged to determine fit statistics for the at least two or more candidate distribution definitions of the plurality of candidate distribution definitions 1910 based on the candidate-specific parameter values 1970 associated with the at least two or more candidate distribution definitions and select a fitted candidate distribution definition 1915 from the plurality of candidate distribution definitions 1910 according to which of the at least two or more candidate distribution definitions produced the best fit statistics while minimizing the objective function.

Figure 20:
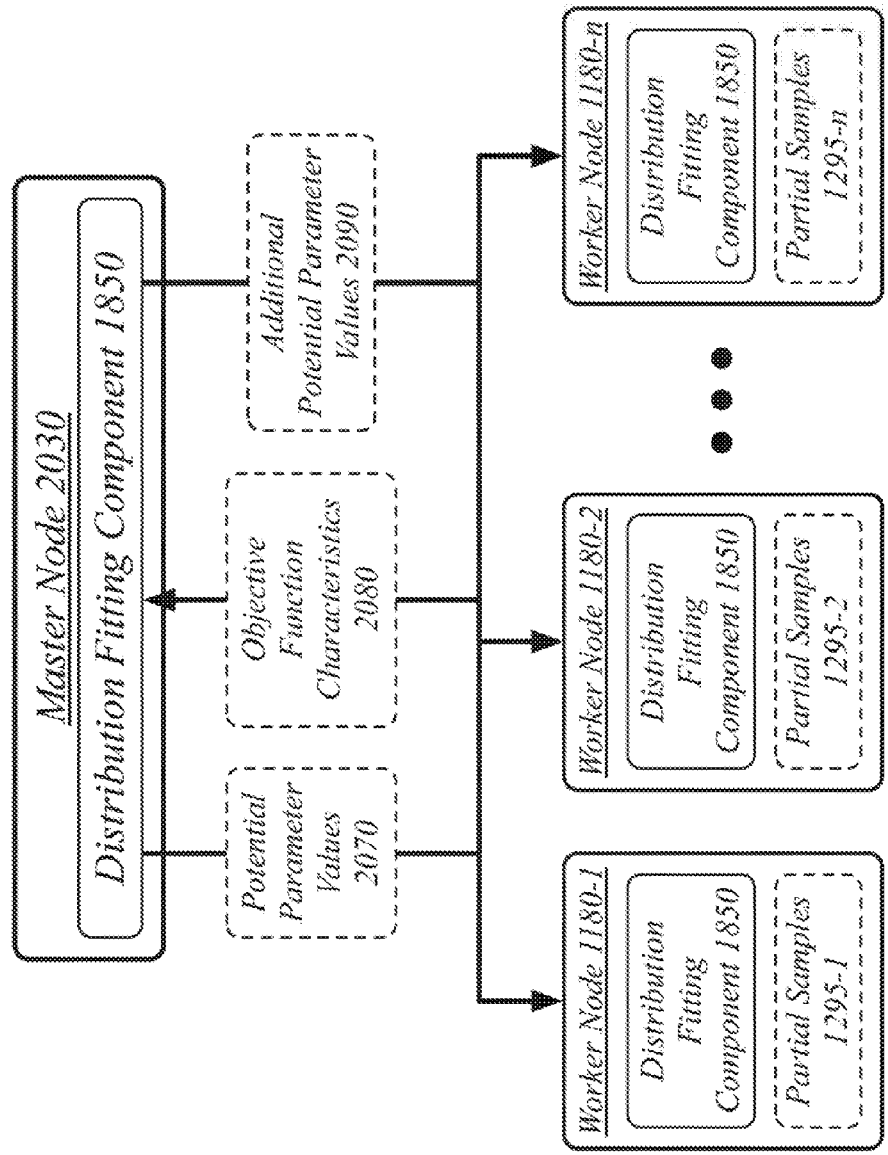
FIG. 20 illustrates an example of generating approximated aggregate statistics from distributed partial samples.

FIG. 20 illustrates an example of finding an optimal set of parameter values for a candidate distribution from distributed partial samples.

In some embodiments, the plurality of model samples may be stored across a plurality of distributed worker node devices. The distributed worker node devices may each execute worker nodes 1180, the worker nodes 1180 each comprising a distribution fitting component 1850. The distribution fitting component on a master node 2030 may generate the potential parameter values 2070 at a master node device. The distribution fitting component 1850 on the master node 2030 may distribute the potential parameter values 2070 from the master node device to a distribution fitting component 1850 on the distributed worker node devices.

The worker nodes 1180 on the distributed worker node devices may generate local objective function characteristics local to each of the distributed worker node devices. The distribution fitting component 1850 on the master node 2030 may receive objective function characteristics 2080 from the distributed worker node devices at the master node device. The objective function characteristics 2080 may comprise an aggregate of locally-generated objective function characteristics from each of the worker nodes 1180. The distribution fitting component 1850 may then determine additional potential parameter values 2090 according to the received objective function characteristics, the additional potential parameter values 2090 corresponding to the iteration of potential parameter values in the search for the converged, optimal parameters.

In some embodiments, the plurality of model samples 1090 may be generated across the plurality of distributed worker node devices. As described with reference to FIG. 12, a sample generation component 1080 may execute on each of the worker nodes 1180 to generate partial samples 1295 distributed across the worker nodes 1180. The plurality of model samples 1090 may be stored in association with the distributed worker node devices on which the plurality of model samples 1090 are generated.

FIG. 21 illustrates one embodiment of a logic flow 2100. The logic flow 2100 may be representative of some or all of the operations executed by one or more embodiments described herein.

In the illustrated embodiment shown in FIG. 21, the logic flow 2100 may receive a plurality of model samples 1090, the model samples 1090 implying a non-parametric distribution of aggregate loss events at block 2102.

The logic flow 2100 may receive a candidate distribution definition 1810, the candidate distribution definition 1810 comprising a combination of at least two component distributions, the candidate distribution definition 1810 comprising one or more parameters at block 2104.

The logic flow 2100 may determine parameter values 1870 for the one or more parameters of the candidate distribution definition 1810, the parameter values 1870 determined by optimizing a non-linear objective function through a search over a multidimensional space of parameter values, the optimization performed by a distribution fitting component 1850 operating on a processor circuit, the objective function calculating a distance between the non-parametric distribution of the loss events as implied by the model samples 1090 and a parametric distribution determined by application of potential parameter values to the candidate distribution definition 1810 at block 2106.

The logic flow 2100 may generate approximated aggregate statistics 1890 for the plurality of model samples 1090 based on an optimized parametric distribution defined by the candidate distribution definition 1810 and the determined parameter values 1870 at block 2108.

The logic flow 2100 may report the approximated aggregate statistics 1890 at block 2110.

The embodiments are not limited to this example.

Figure 22:
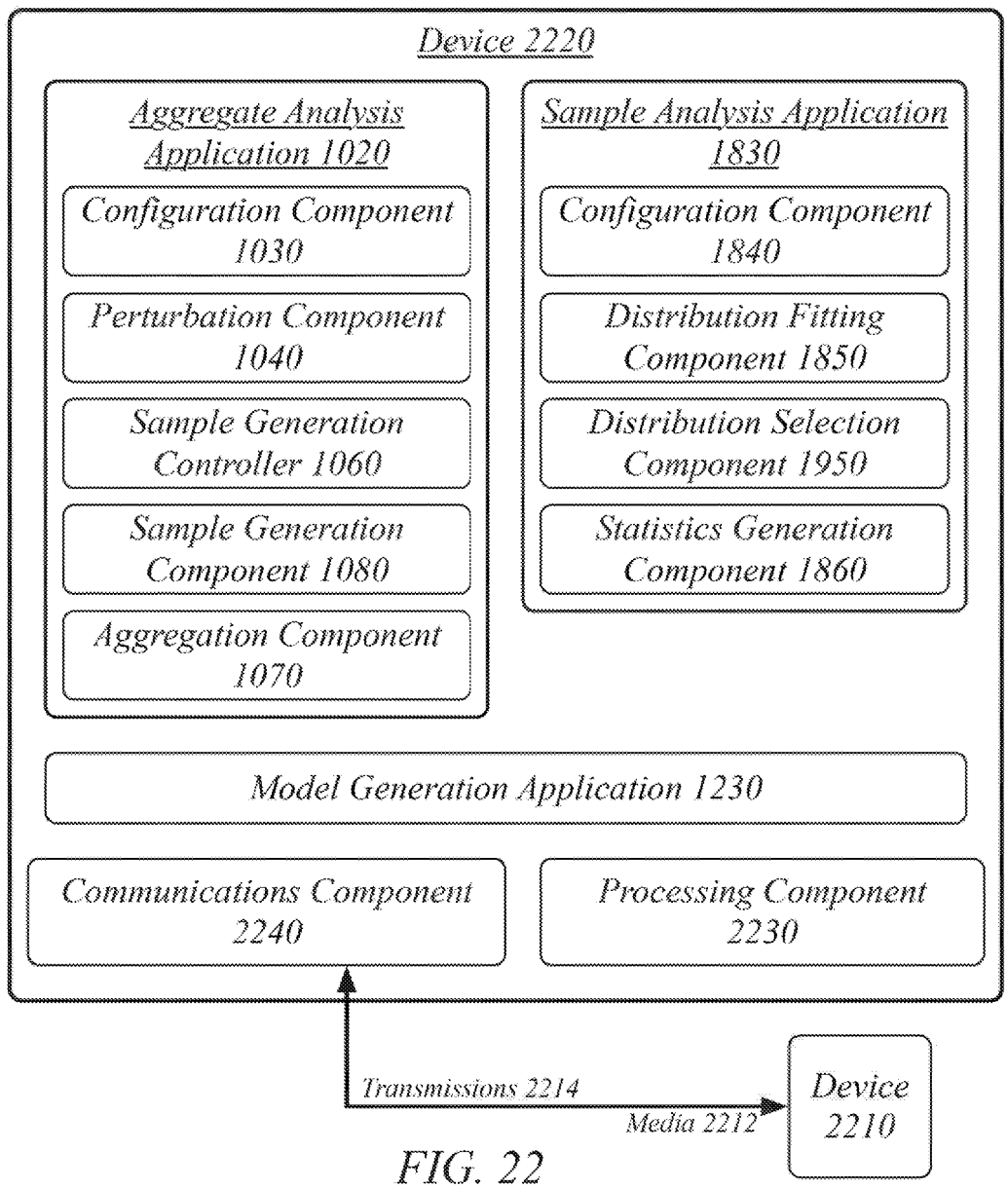
FIG. 22 illustrates an example of an embodiment of a centralized system for the system of FIG. 1.

FIG. 22 illustrates a block diagram of a centralized system 2200. The centralized system 2200 may implement some or all of the structure and/or operations for the aggregate distribution analysis system 100 in a single computing entity, such as entirely within a single device 2220.

The device 2220 may comprise any electronic device capable of receiving, processing, and sending information for the aggregate distribution analysis system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 2220 may execute processing operations or logic for the aggregate distribution analysis system 100 using a processing component 2230. The processing component 2230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 2220 may execute communications operations or logic for the aggregate distribution analysis system 100 using communications component 2240. The communications component 2240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 2240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 2212 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated transmission, and so forth. Examples of wireless communications media may include acoustic, radio-frequency (RF) spectrum, infrared and other wireless media.

The device 2220 may communicate with other device 2210 over a communications media 2212 using communications transmissions 2214 via the communications component 2240. The device 2210 may be internal or external to the device 2220 as desired for a given implementation.

The device 2220 may implement the aggregate distribution analysis system 100 in a single device. The device 2220 may implement the aggregate analysis application 1020 comprising the configuration component 1030, perturbation component 1040, sample generation controller 1060, sample generation component 1080, and aggregation component 1070. The device 2220 may comprise the sample analysis application 1830 comprising the configuration component 1840, distribution fitting component 1850, distribution selection component 1950, and statistics generation component 1860. The device 2220 may implement the model generation application 1230.

The device 2210 may include an information store of historical loss data for an entity. The transmissions 2214 sent over media 2212 may comprise the receipt of historical loss data for the entity from the device 2210.

Figure 23:
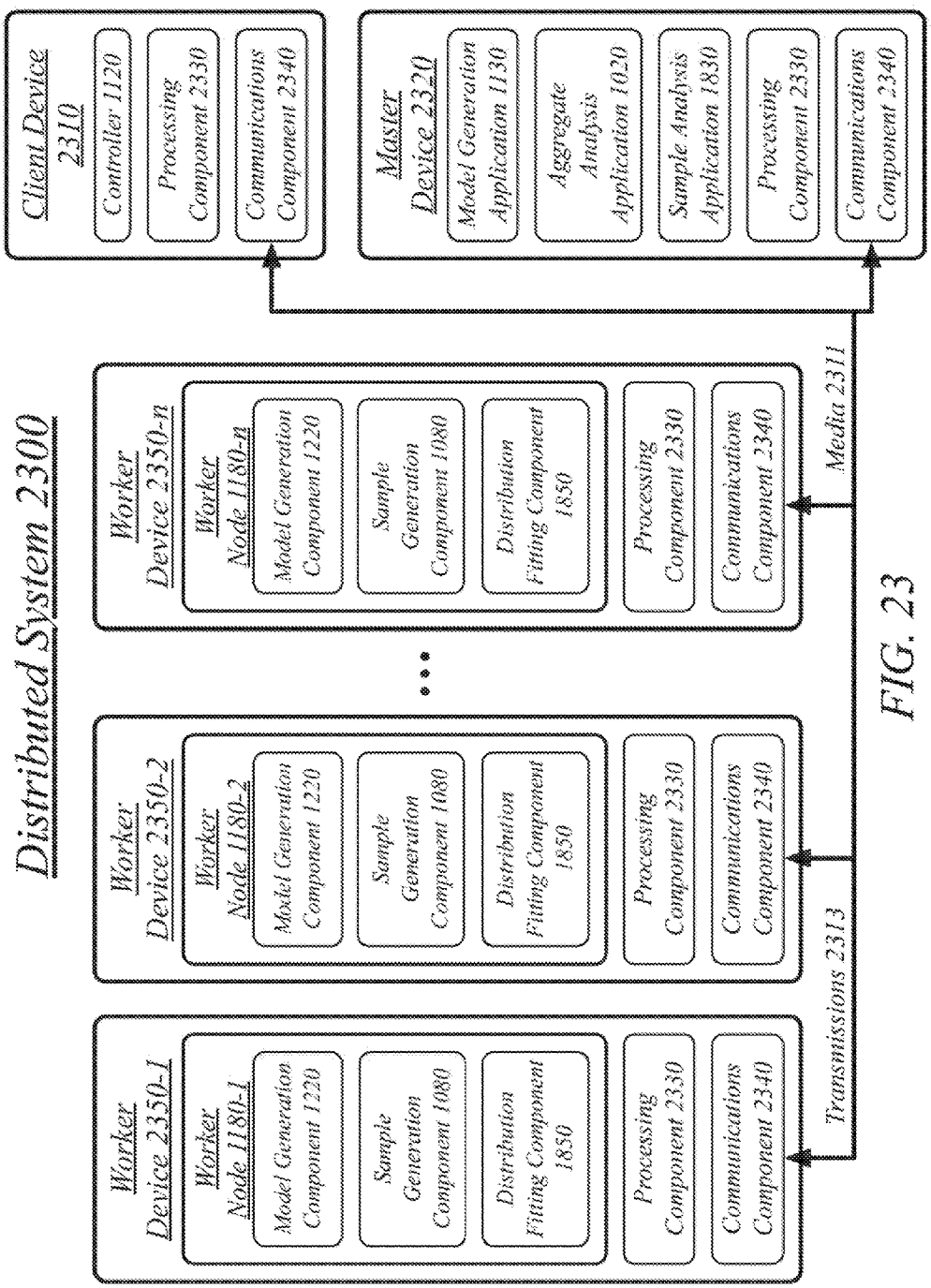
FIG. 23 illustrates an example of an embodiment of a distributed system for the system of FIG. 1.

FIG. 23 illustrates a block diagram of a distributed system 2300. The distributed system 2300 may distribute portions of the structure and/or operations for the aggregate distribution analysis system 100 across multiple computing entities. Examples of distributed system 2300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 2300 may comprise a client device 2310, a master device 2320, and a plurality of worker devices 2350. In general, the client device 2310, master device 2320, and worker devices 2350 may be the same or similar to the device 1720 as described with reference to FIG. 17. For instance, the client device 2310, master device 2320, and worker devices 2350 may each comprise a processing component 2330 and a communications component 2340 which are the same or similar to the processing component 2330 and the communications component 2340, respectively, as described with reference to FIG. 22. In another example, the devices 2310, 2320, 2350 may communicate over a communications media 2312 using communications transmissions 2314 via the communications components 2340.

The client device 2310 may comprise or employ one or more client programs that operate to perform various methodologies in accordance with the described embodiments. In one embodiment, for example, the client device 2310 may implement controller 1120.

The master device 2320 may comprise or employ one or more server programs that operate to perform various methodologies in accordance with the described embodiments. In one embodiment, for example, the master device 2320 may implement model generation application 1130, aggregate analysis application 1020, and sample analysis application 1830. The master device 2320 may comprise the master node 2030.

The worker devices 2350 may comprise or employ one or more server programs that operate to perform various methodologies in accordance with the described embodiments. In one embodiment, for example, the worker devices 2350 may implement the worker nodes 1180, the worker nodes 1180 comprising model generation components 1220, sample generation components 1080, and distribution fitting components 1850.

Transmissions 2313 transmitted over media 2311 may comprise the interoperation of the devices 2310, 2320, and 2350.

Figure 24:
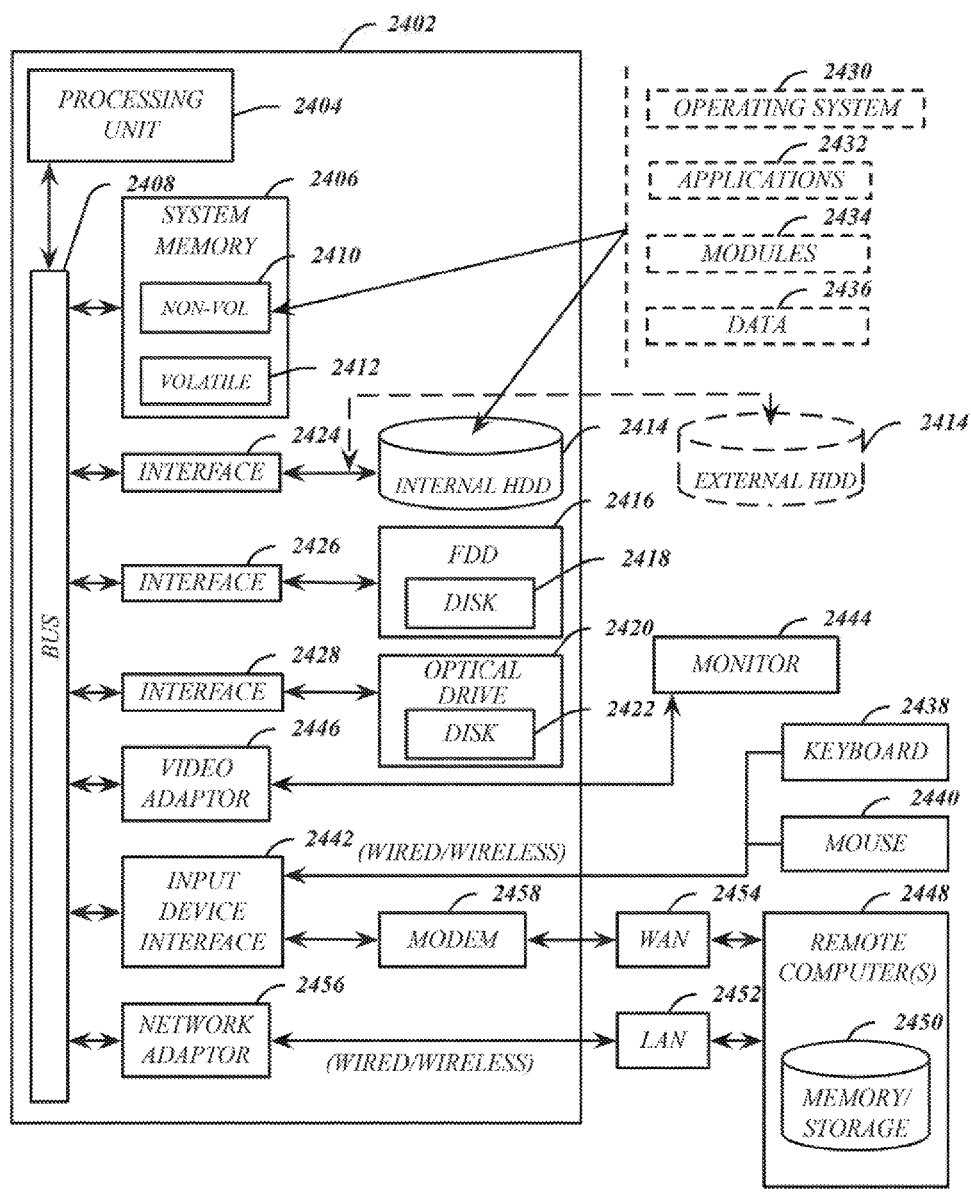
FIG. 24 illustrates an example of an embodiment of a computing architecture.

FIG. 24 illustrates an embodiment of an exemplary computing architecture 2400 suitable for implementing various embodiments as previously described. In one embodiment, the computing architecture 2400 may comprise or be implemented as part of an electronic device. Examples of an electronic device may include those described with reference to FIG. 17 and FIG. 18, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 2400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of transmissions communicated over the communications media. The information can be implemented as transmissions allocated to various transmission lines. In such allocations, each message is a transmission. Further embodiments, however, may alternatively employ data messages. Such data messages may be sent across various connections. Exemplary connections include parallel interfaces, serial interfaces, and bus interfaces.

The computing architecture 2400 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 2400.

As shown in FIG. 24, the computing architecture 2400 comprises a processing unit 2404, a system memory 2406 and a system bus 2408. The processing unit 2404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 2404.

The system bus 2408 provides an interface for system components including, but not limited to, the system memory 2406 to the processing unit 2404. The system bus 2408 can be any of several types of bus structure that may further interconnect to a memory bus (with or without a memory controller), a peripheral bus, and a local bus using any of a variety of commercially available bus architectures. Interface adapters may connect to the system bus 2408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 2400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 2406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 24, the system memory 2406 can include non-volatile memory 2410 and/or volatile memory 2412. A basic input/output system (BIOS) can be stored in the non-volatile memory 2410.

The computer 2402 may include various types of computer-readable storage media in the form of one or more lower speed memory units, including an internal (or external) hard disk drive (HDD) 2414, a magnetic floppy disk drive (FDD) 2416 to read from or write to a removable magnetic disk 2418, and an optical disk drive 2420 to read from or write to a removable optical disk 2422 (e.g., a CD-ROM or DVD). The HDD 2414, FDD 2416 and optical disk drive 2420 can be connected to the system bus 2408 by a HDD interface 2424, an FDD interface 2426 and an optical drive interface 2428, respectively. The HDD interface 2424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 2410, 2412, including an operating system 2430, one or more application programs 2432, other program modules 2434, and program data 2436. In one embodiment, the one or more application programs 2432, other program modules 2434, and program data 2436 can include, for example, the various applications and/or components of the aggregate distribution analysis system 100.

A user can enter commands and information into the computer 2402 through one or more wire/wireless input devices, for example, a keyboard 2438 and a pointing device, such as a mouse 2440. Other input devices may include microphones, infrared (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 2404 through an input device interface 2442 that is coupled to the system bus 2408, but can be connected by other interfaces such as a parallel port, IEEE 1394 serial port, a game port, a USB port, an IR interface, and so forth.

A monitor 2444 or other type of display device is also connected to the system bus 2408 via an interface, such as a video adaptor 2446. The monitor 2444 may be internal or external to the computer 2402. In addition to the monitor 2444, a computer typically includes other peripheral output devices, such as speakers, printers, and so forth.

The computer 2402 may operate in a networked environment using logical connections via wire and/or wireless communications to one or more remote computers, such as a remote computer 2448. The remote computer 2448 can be a workstation, a server computer, a router, a personal computer, portable computer, microprocessor-based entertainment appliance, a peer device or other common network node, and typically includes many or all of the elements described relative to the computer 2402, although, for purposes of brevity, only a memory/storage device 2450 is illustrated. The logical connections depicted include wire/wireless connectivity to a local area network (LAN) 2452 and/or larger networks, for example, a wide area network (WAN) 2454. Such LAN and WAN networking environments are commonplace in offices and companies, and facilitate enterprise-wide computer networks, such as intranets, all of which may connect to a global communications network, for example, the Internet.

When used in a LAN networking environment, the computer 2402 is connected to the LAN 2452 through a wire and/or wireless communication network interface or adaptor 2456. The adaptor 2456 can facilitate wire and/or wireless communications to the LAN 2452, which may also include a wireless access point disposed thereon for communicating with the wireless functionality of the adaptor 2456.

When used in a WAN networking environment, the computer 2402 can include a modem 2458, or is connected to a communications server on the WAN 2454, or has other means for establishing communications over the WAN 2454, such as by way of the Internet. The modem 2458, which can be internal or external and a wire and/or wireless device, connects to the system bus 2408 via the input device interface 2442. In a networked environment, program modules depicted relative to the computer 2402, or portions thereof, can be stored in the remote memory/storage device 2450. It will be appreciated that the network connections shown are exemplary and other means of establishing a communications link between the computers can be used.

The computer 2402 is operable to communicate with wire and wireless devices or entities using the IEEE 802 family of standards, such as wireless devices operatively disposed in wireless communication (e.g., IEEE 802.24 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.24x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 25 illustrates a block diagram of an exemplary communications architecture 2500 suitable for implementing various embodiments as previously described. The communications architecture 2500 includes various common communications elements, such as a transmitter, receiver, transceiver, radio, network interface, baseband processor, antenna, amplifiers, filters, power supplies, and so forth. The embodiments, however, are not limited to implementation by the communications architecture 2500.

As shown in FIG. 25, the communications architecture 2500 comprises includes one or more clients 2502 and servers 2504. The clients 2502 may implement the client device 2310 or worker devices 2350. The servers 2504 may implement the master device 2320. The clients 2502 and the servers 2504 are operatively connected to one or more respective client data stores 2508 and server data stores 2510 that can be employed to store information local to the respective clients 2502 and servers 2504, such as cookies and/or associated contextual information.

The clients 2502 and the servers 2504 may communicate information between each other using a communication framework 2506. The communications framework 2506 may implement any well-known communications techniques and protocols. The communications framework 2506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 2506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2502 and the servers 2504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. For example, Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may have a combination or a variation of the systems mentioned above. Some systems may be of other types, designs and configurations.

A computer-implemented method may comprise receiving a compound model specification comprising a frequency model and a severity model, the compound model specification including a model error comprising a frequency model error and a severity model error; generating, using a perturbation component operating on a processor circuit, a plurality of frequency models from the frequency model and the frequency model error by perturbing the frequency model according to the frequency model error, wherein each of the generated plurality of frequency models corresponds to an adjustment of the received frequency model according to a deviation from the received frequency model within the frequency model error; generating, using a perturbation component operating on a processor circuit, a plurality of severity models from the severity model and the severity model error by perturbing the severity model according to the severity model error, wherein each of the generated plurality of severity models corresponds to an adjustment of the received severity model according to a deviation from the received severity model within the severity model error; generating a plurality of compound model samples from each of the plurality of frequency models and severity models; and generating aggregate statistics from the plurality of compound model samples.

A computer-implemented method may further comprise wherein the frequency model corresponds to a predicted loss frequency for an entity over a period of time, wherein the severity model corresponds to a predicted severity of loss for the entity, wherein the aggregate statistics and estimates of errors in the compound model specification correspond to a prediction of aggregate loss for the entity over the period of time.

A computer-implemented method may further comprise wherein the frequency model and severity model are generated based on historic loss data for the entity.

A computer-implemented method may further comprise wherein the aggregate statistics comprise an aggregate prediction and an error of the aggregate prediction, wherein the error of the aggregate prediction reflects an estimated error of the compound model specification.

A computer-implemented method may further comprise wherein the compound model specification includes a plurality of covariates, wherein a model error specification includes a plurality of covariate uncertainties, wherein perturbing the model includes perturbing the covariates according to the plurality of covariate uncertainties.

A computer-implemented method may further comprise wherein the aggregate statistics comprise an aggregate prediction and an error of the aggregate prediction, wherein the error of the aggregate prediction reflects the plurality of covariate uncertainties.

A computer-implemented method may further comprise dividing the generation of the plurality of compound model samples among a plurality of distributed worker nodes.

A computer-implemented method may further comprise receiving a number of models to generate, the plurality of frequency models and the plurality of severity models generated based on the received number; determining that the number of models is at least equal in number to the plurality of distributed worker nodes; and dividing the generation of the plurality of compound model samples among the plurality of distributed worker nodes by assigning each of the plurality of distributed worker nodes the generation of all compound model samples for one or more of the plurality of frequency models and the plurality of severity models.

A computer-implemented method may further comprise receiving a number of models to generate, the plurality of frequency models and the plurality of severity models generated based on the received number; determining that the number of models is fewer in number than the plurality of distributed worker nodes; and dividing the generation of the plurality of compound model samples across the plurality of distributed worker nodes by assigning each of the plurality of distributed worker nodes to generate a portion of samples for all of the plurality of frequency models and the plurality of severity models.

A computer-implemented method may further comprise receiving partial statistics from each of the distributed worker nodes; and generating the aggregate statistics from the partial statistics received from each of the distributed worker nodes.

An apparatus may comprise a processor circuit on a device; a configuration component operative on the processor circuit to receive a compound model specification comprising a frequency model and a severity model, the compound model specification including a model error comprising a frequency model error and a severity model error; a perturbation component operative on the processor circuit to generate a plurality of frequency models from the frequency model and the frequency model error by perturbing the frequency model according to the frequency model error, wherein each of the generated plurality of frequency models corresponds to an adjustment of the received frequency model according to a deviation from the received frequency model within the frequency model error, and to generate a plurality of severity models from the severity model and the severity model error by perturbing the severity model according to the severity model error, wherein each of the generated plurality of severity models corresponds to an adjustment of the received severity model according to a deviation from the received severity model within the severity model error; a sample generation controller operative to initiate the generation of a plurality of compound model samples from each of the plurality of frequency models and severity models; and an aggregation component operative to generate aggregate statistics from the plurality of compound model samples. The apparatus may be operative to implement any of the computer-implemented methods described herein.

A computer-implemented method may comprise receiving a plurality of model samples, the model samples implying a non-parametric distribution of aggregate loss events; receiving a candidate distribution definition, the candidate distribution definition comprising a combination of at least two component distributions, the candidate distribution definition comprising one or more parameters; determining parameter values for the one or more parameters of the candidate distribution definition, the parameter values determined by optimizing a non-linear objective function through a search over a multidimensional space of parameter values, the optimization performed by a distribution fitting component operating on a processor circuit, the objective function calculating a distance between the non-parametric distribution of the aggregate loss events as implied by the model samples and a parametric distribution determined by application of potential parameter values to the candidate distribution definition; generating approximated aggregate statistics for the plurality of model samples based on an optimized parametric distribution defined by the candidate distribution definition and the determined parameter values; and reporting the approximated aggregate statistics.

A computer-implemented method may further comprise wherein the plurality of model samples are stored across a plurality of distributed worker node devices, further comprising: generating the potential parameter values at a master node device; distributing the potential parameter values from the master node device to the distributed worker node devices; receiving objective function characteristics from the distributed worker node devices at the master node device; and determining additional potential parameter values according to the received objective function characteristics.

A computer-implemented method may further comprise wherein the plurality of model samples are generated across the plurality of distributed worker node devices, the plurality of model samples stored in association with the distributed worker node devices on which the plurality of model samples are generated.

A computer-implemented method may further comprise wherein the model samples comprise simulated events generated according to a model, wherein the model is generated from historical events.

A computer-implemented method may further comprise wherein the simulated events comprise simulated losses for an entity, wherein the historical events comprise historical losses for the entity.

A computer-implemented method may further comprise wherein the approximated aggregate statistics comprise approximated quantiles of the parametric distribution of the model samples.

A computer-implemented method may further comprise wherein the candidate distribution definition comprises a combination of two candidate distribution definitions, the two candidate distribution definitions comprising a main region distribution and a tail region distribution.

A computer-implemented method may further comprise wherein the candidate distribution definition comprises a combination of a determined number of identical component distributions, wherein the determined number of the identical distributions is determined according to a component-number search over a range of using two of the identical distributions and using a user-defined maximum number of the identical distributions.

A computer-implemented method may further comprise the component-number search performed using a criteria that selects a minimum number of the identical distributions that maximizes a fit statistics.

A computer-implemented method may further comprise receiving a plurality of candidate distribution definitions; searching for candidate-specific parameter values for each of the plurality of candidate distribution definitions; determining candidate-specific parameter values for at least two or more candidate distribution definitions of the plurality of candidate distribution definitions; determining fit statistics for the at least two or more candidate distribution definitions of the plurality of candidate distribution definitions based on the candidate-specific parameter values associated with the at least two or more candidate distribution definitions; and selecting a fitted candidate distribution definition from the plurality of candidate distribution definitions according to which of the at least two or more candidate distribution definitions produced fit statistics best satisfying a candidate-distribution objective function.

An apparatus may comprise a processor circuit on a device; a configuration component operative on the processor circuit to receive a candidate distribution definition, the candidate distribution definition comprising a combination of at least two component distributions, the candidate distribution definition comprising one or more parameters; a distribution fitting component operative on the processor circuit to receive a plurality of model samples, the model samples implying a non-parametric distribution of aggregate loss events, and determine parameter values for the one or more parameters of the candidate distribution definition, the parameter values determined by optimizing a non-linear objective function through a search over a multidimensional space of parameter values, the objective function calculating a distance between the non-parametric distribution of the aggregate loss events as implied by the model samples and a parametric distribution determined by application of potential parameter values to the candidate distribution definition; and a statistics generation component operative on the processor circuit to generate approximated aggregate statistics for the plurality of model samples based on an optimized parametric distribution defined by the candidate distribution definition and the determined parameter values and report the approximated aggregate statistics. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical transmissions capable of being stored, transferred, combined, compared, and otherwise manipulated. It proves convenient at times, principally for reasons of common usage, to refer to these transmissions as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method operations. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architectures are intended to embrace all such alterations, modifications and variations that fall within the spirit and scope of the appended claims.

What is claimed is:

1. At least one non-transitory computer readable storage medium comprising instructions that, when executed, cause a system to:
   receive, at a master node of a distributed system, a compound model specification comprising frequency models, severity models, and one or more adjustment functions, wherein at least one model of the frequency models and the severity models depend on one or more regressors;
   distribute, from the master node, the compound model specification to worker nodes of the distributed system, each of the worker nodes to at least generate a portion of samples for use in predicting compound distribution model estimates;
   receive, at the master node, scenario data comprising values of the one or more regressors;
   determine, at the master node, whether the scenario data includes externally simulated counts or does not include externally simulated counts;
   distribute, from the master node, a copy of the scenario data to the worker nodes based on a determination that the scenario data does not include externally simulated counts;
   distribute, from the master node, the scenario data equitably among worker nodes based on a determination that the scenario data includes externally simulated counts;
   based on the determination that the scenario data does not include externally simulated counts generate, at each of the worker nodes, one or more computer simulated events for a plurality of units using a frequency model of the frequency models, the computer simulated events generated based on the values of the one or more regressors;
   generate, at each of the worker nodes, a ground-up severity value for an event for a unit of the plurality of units using a severity model of the severity models, the ground-up severity value generated based on the values of the one or more regressors, the unit selected at random from the plurality of units;
   determine, at each of the worker node, an adjusted severity value based on applying at least one of the one or more adjustment functions to the ground-up severity value generated from the severity model of the severity models;
   generate, at each of the worker nodes, an aggregate value based on the ground-up severity value and an adjusted aggregate value based on the adjusted severity value for the one or more computer simulated events;
   determine a total number of events to simulate for a plurality of units based on summing a number of events for each of a plurality of units;
   determine whether the total number of events have been simulated;
   in response to determining the total number of events have been simulated, add the aggregate value and the adjusted aggregate value as next points in an unadjusted sample and an adjusted sample, respectively;
   in response to determining the total number of events have not been simulated,
      select a unit from the plurality of units at random;
      generate a ground-up severity value for another event of the selected unit using the severity model of the selected unit;
      determine an adjusted severity value for the selected unit based on applying at least one of the one or more adjustment functions to the ground-up severity value; and
      update the aggregate value based on the ground-up severity value and the adjusted aggregate value based on the adjusted severity value;
   receive, at the master node, sample portions of aggregate values and adjusted aggregate values from each of the worker nodes; and
   predict, at the master node, the compound distribution model estimates based on the sample portions of the aggregate values and the adjusted aggregate values.

2. The at least one non-transitory computer readable storage medium of claim 1, the system to assemble, at the master node, all the sample portions to form a full sample of the aggregate values and the adjusted aggregate values, the full sample of the aggregates values and the adjusted aggregate values used to predict the compound distribution model estimates.

3. The at least non-transitory one computer readable storage medium of claim 1, wherein one of the frequency models having a subset of the one or more regressors, and one of the severity models having another subset of the one or more regressors, and wherein the subset of the one or more regressors and the another subset of the one or more regressors have overlapping regressors, or wherein the subset of the one or more regressors and the another subset of the one or more regressors have no overlapping regressors.

4. The at least one non-transitory computer readable storage medium of claim 1, the scenario data comprising observations for the plurality of units, an observation comprising at least one of the values of the regressors used in the frequency model to generate the one or more computer simulated events or in the severity model to generate the ground-up severity value.

5. The at least one non-transitory computer readable storage medium of claim 1, the computer readable storage medium comprising further instructions that, when executed, cause the system to:
receive the values of the one or more regressors wherein each of the one or more regressors is a random variable;
receive regressor uncertainties for the values of the one or more regressors, wherein each of the regressor uncertainties is defined by a probability distribution of a regressor; and
perform a perturbation analysis to estimate an effect of the regressor uncertainties and uncertainties in model parameters of the frequency model and the severity model on the uncertainty of the compound distribution model estimates.

6. The at least one non-transitory computer readable storage medium of claim 1, comprising further instructions that, when executed, cause the system to:
set the aggregate value as a point in an unadjusted sample of the samples;
set the adjusted aggregate value as a point in an adjusted sample of the samples;
determine the compound distribution model estimates from the unadjusted sample and the adjusted sample; and
send the compound distribution model estimates as results to a client computer for presentation.

7. The at least one non-transitory computer readable storage medium of claim 1, comprising further instructions, when executed, cause the system to generate the aggregate value based on summing the ground-up severity value and one or more other ground-up severity values, and the adjusted aggregate value based on summing the adjusted severity value and one or more other adjusted severity values.

8. The at least one non-transitory computer readable storage medium of claim 1, comprising further instructions that, when executed, cause the system to:
determine whether the compound model specification includes the scenario data with externally simulated counts;
in response to determining the compound model specification does not include the scenario data with the externally simulated counts, divide a total sample size equally among the worker nodes to simulate samples; and
in response to determining the compound model specification does include scenario data including the externally simulated counts, assign a portion of the externally simulated counts to each of the worker nodes to simulate samples.

9. A computer implemented method, comprising:
receiving, at a master node of a distributed system, a compound model specification comprising frequency models, severity models, and one or more adjustment functions, wherein at least one model of the frequency models and the severity models depend on one or more regressors;
distributing, from the master node, the compound model specification to worker nodes of the distributed system, each of the worker nodes to at least generate a portion of samples for use in predicting compound distribution model estimates;
receiving, at the master node, scenario data comprising values of the one or more regressors;
determining, at the master node, whether the scenario data includes externally simulated counts or does not include externally simulated counts;
distributing, from the master node, a copy of the scenario data to the worker nodes based on a determination that the scenario data does not include externally simulated counts, or distributing, from the master node, the scenario data equitably among worker nodes based on a determination that the scenario data includes externally simulated counts;
based on the determination that the scenario data does not include externally simulated counts generating, at each of the worker nodes, one or more computer simulated events for a plurality of units using a frequency model of the frequency models, the computer simulated events generated based on the values of the one or more regressors;
generating, at each of the worker nodes, a ground-up severity value for an event for a unit of the plurality of units using a severity model of the severity models, the ground-up severity value generated based on the values of the one or more regressors, the unit selected at random from the plurality of units;
determining, at each the worker node, an adjusted severity value based on applying at least one of the one or more adjustment functions to the ground-up severity value generated from the severity model of the severity models;
generating, at each of the worker nodes, an aggregate value based on the ground-up severity value and an adjusted aggregate value based on the adjusted severity value for the one or more computer simulated events;
determining a total number of events to computer simulate for a plurality of units based on summing a number of events for each of a plurality of units;
determining whether the total number of events have been simulated; and
in response to determining the total number of events have been simulated, adding the aggregate value and the adjusted aggregate value as next points in an unadjusted sample and an adjusted sample, respectively;
in response to determining the total number of events have not been simulated,
selecting a unit from the plurality of units at random;
generating a ground-up severity value for another event of the selected unit using the severity model of the selected unit;
determining an adjusted severity value for the selected unit based on applying at least one of the one or more adjustment functions to the ground-up severity value; and
updating the aggregate value based on the ground-up severity value and the adjusted aggregate value based on the adjusted severity value;
receiving, at the master node, sample portions of aggregate values and adjusted aggregate values from each of the worker nodes; and
predicting, at the master node, the compound distribution model estimates based on the sample portions of the aggregate values and the adjusted aggregate values.

10. The computer-implemented method of claim 9, comprising assembling, at the master node, all the sample portions to form a full sample of the aggregate values and the adjusted aggregate values, the full sample of the aggregates values and the adjusted aggregate values used to predict the compound distribution model estimates.

11. The computer implemented method of claim 9, wherein one of the frequency models having a subset of the one or more regressors, and one of the severity models having another subset of the one or more regressors, and wherein the subset of the one or more regressors and the another subset of the one or more regressors have overlapping regressors, or wherein the subset of the one or more regressors and the another subset of the one or more regressors have no overlapping regressors.

12. The computer implemented method of claim 9, the scenario data comprising observations for the plurality of units, an observation comprising at least one of the values of the regressors used in the frequency model to generate the one or more computer simulated events or in the severity model to generate the ground-up severity value.

13. The computer implemented method of claim 9, comprising:
    receiving the values of the one or more regressors wherein each of the one or more regressors is a random variable;
    receiving regressor uncertainties for the values of the one or more regressors, wherein each of the regressor uncertainties is defined by a probability distribution of a regressor; and
    performing a perturbation analysis to account for an effect of the regressor uncertainties and uncertainties in model parameters of the frequency model and the severity model on the compound distribution model estimates.

14. The computer implemented method of claim 9, comprising:
    setting the aggregate value as a point in an unadjusted sample of the samples;
    setting the adjusted aggregate value as a point in an adjusted sample of the samples;
    determining the compound distribution model estimates from the unadjusted sample and the adjusted sample; and
    sending the compound distribution model estimates as results to a client computer for presentation.

15. The computer implemented method of claim 9, comprising generating the aggregate value based on summing the ground-up severity value and one or more other ground-up severity values, and the adjusted aggregate value based on summing the adjusted severity value and one or more other adjusted severity values.

16. The computer implemented method of claim 9, comprising:
    determining whether the compound model specification includes the scenario data with externally simulated counts;
    in response to determining the compound model specification does not include the scenario data with the externally simulated counts, dividing a total sample size equally among the worker nodes to simulate samples; or
    in response to determining the compound model specification does include scenario data including the externally simulated counts, assigning a portion of the externally simulated counts to each of the worker nodes to simulate samples.

17. A system, comprising:
    a master node and worker nodes of a distributed system, the master node to:
        receive a compound model specification comprising frequency models, severity models, and one or more adjustment functions, wherein at least one model of the frequency models and the severity models depend on one or more regressors;
        distribute the compound model specification to worker nodes of the distributed system, each of the worker nodes to at least generate a portion of samples for use in predicting compound distribution model estimates;
        receive scenario data comprising values of the one or more regressors;
        determine whether the scenario data includes externally simulated counts or does not include externally simulated counts;
        distribute the scenario data to the worker nodes if the scenario data does not include externally simulated counts, or
        distribute the scenario data equitably among the worker nodes if the scenario data includes externally simulated counts,
    each of the worker nodes to:
        based on the determination that the scenario data does not include externally simulated counts generate one or more computer simulated events for a plurality of units using a frequency model of the frequency models, the computer simulated events generated based on the values of the one or more regressors,
        generate a ground-up severity value for an event for a unit of the plurality of units using a severity model of the severity models, the ground-up severity value generated based on the values of the one or more regressors, the unit selected at random from the plurality of units,
        determine an adjusted severity value based on applying at least one of the one or more adjustment functions to the ground-up severity value generated from the severity model of the severity models,
        generate an aggregate value based on the ground-up severity value and an adjusted aggregate value based on the adjusted severity value for the one or more computer simulated events; and
    determine a total number of events to computer simulate for a plurality of units based on summing a number of events for each of a plurality of units;
    determine whether the total number of events have been simulated; and
    in response to determining the total number of events have been simulated, add the aggregate value and the adjusted aggregate value as next points in an unadjusted sample and an adjusted sample, respectively;
    in response to determining the total number of events have not been simulated,
        select a unit from the plurality of units at random;
        generate a ground-up severity value for another event of the selected unit using the severity model of the selected unit;
        determine an adjusted severity value for the selected unit based on applying at least one of the one or more adjustment functions to the ground-up severity value; and
        update the aggregate value based on the ground-up severity value and the adjusted aggregate value based on the adjusted severity value; and
    receive sample portions of aggregate values and adjusted aggregate values from each of the worker nodes;

predict the compound distribution model estimates based on the sample portions of the aggregate values and the adjusted aggregate values.

18. The system of claim 17, the master node to assemble all of the sample portions to form a full sample of the aggregate values and the adjusted aggregate values, the full sample of the aggregates values and the adjusted aggregate values used to predict the compound distribution model estimates.

19. The system of claim 17, wherein one of the frequency models having a subset of the one or more regressors, and one of the severity models having another subset of the one or more regressors, and wherein the subset of the one or more regressors and the another subset of the one or more regressors have overlapping regressors, or wherein the subset of the one or more regressors and the another subset of the one or more regressors have no overlapping regressors.

20. The system of claim 17, the scenario data comprising observations for the plurality of units, an observation comprising at least one of the values of the regressors used in the frequency model to generate the one or more computer simulated events or in the severity model to generate the ground-up severity value.

21. The system of claim 17, each of the worker nodes to:
receiving the values of the one or more regressors wherein each of the one or more regressors is a random variable;
receiving regressor uncertainties for the values of the one or more regressors, wherein each of the regressor uncertainties is defined by a probability distribution of a regressor; and
performing a perturbation analysis to account for an effect of the regressor uncertainties and uncertainties in model parameters of the frequency model and the severity model on the compound distribution model estimates.

22. The system of claim 17, the master node to:
set the aggregate value as a point in an unadjusted sample of the samples;
set the adjusted aggregate value as a point in an adjusted sample of the samples;
determine the compound distribution model estimates from the unadjusted sample and the adjusted sample; and
send the compound distribution model estimates as results to a client computer for presentation.

23. The system of claim 17, the master node to generate the aggregate value based on summing the ground-up severity value and one or more other ground-up severity values, and the adjusted aggregate value based on summing the adjusted severity value and one or more other adjusted severity values.

24. The system of claim 17, the master node to:
determine whether the compound model specification includes the scenario data with externally simulated counts;
in response to determining the compound model specification does not include the scenario data with the externally simulated counts, divide a total sample size equally among the worker nodes to simulate samples; and
in response to determining the compound model specification does include scenario data including the externally simulated counts, assign a portion of the externally simulated counts to each of the worker nodes to simulate samples.

* * * * *